United States Patent
Kesal et al.

(10) Patent No.: US 7,454,088 B2
(45) Date of Patent: Nov. 18, 2008

(54) ESTIMATING ORIENTATION ANGLE AND TRANSLATION VALUES OF A SCANNED IMAGE

(75) Inventors: Mustafa Kesal, Urbana, IL (US); M. Kivanc Mihcak, Redmond, WA (US); Gary K. Starkweather, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 10/719,690

(22) Filed: Nov. 20, 2003

(65) Prior Publication Data

US 2005/0111755 A1    May 26, 2005

(51) Int. Cl.
  *G06K 9/36*   (2006.01)
(52) U.S. Cl. ............... 382/286; 382/276; 382/293; 382/294; 358/3.09; 358/1.9; 345/427
(58) Field of Classification Search .......... 382/286, 382/276, 293, 294
See application file for complete search history.

(56) References Cited

U.S. PATENT DOCUMENTS

| | | | | |
|---|---|---|---|---|
| 5,463,720 A | * | 10/1995 | Granger | 358/1.9 |
| 5,550,937 A | * | 8/1996 | Bell et al. | 382/293 |
| 5,594,845 A | * | 1/1997 | Florent et al. | 345/427 |
| 6,151,422 A | * | 11/2000 | Hayduchok et al. | 382/286 |
| 6,178,271 B1 | * | 1/2001 | Maas, III | 382/294 |
| 6,668,099 B1 | * | 12/2003 | Nikitin | 382/286 |
| 6,834,126 B1 | * | 12/2004 | Henry et al. | 382/276 |
| 7,031,025 B1 | * | 4/2006 | He et al. | 358/3.09 |

* cited by examiner

*Primary Examiner*—Samir A Ahmed
*Assistant Examiner*—Aklilu k Woldemariam
(74) *Attorney, Agent, or Firm*—Lee & Hayes, PLLC

(57) ABSTRACT

Exemplary methods for estimating an orientation angle and a translation values for scanned images are disclosed. The methods described herein may be embodied as logic instructions on a computer-readable medium. In one exemplary implementation meaningful image information is removed from a scanned image, resulting in a transformed image that comprises alternating, parallel lines disposed at an orientation angle relative to an orthogonal axis. The orientation angle may be determined using geometric techniques or statistical correlation techniques, and statistical correlation techniques may be implemented to determine translation values.

17 Claims, 19 Drawing Sheets

| 1 | 2 | 3 | 4 | 5 | Θ |
|---|---|---|---|---|---|
| $\theta_1$ | $\theta_2$ | $\theta_3$ | $\theta_4$ | $\theta_5$ | $\theta_\Theta$ |
| Corr($\theta_1$) | Corr($\theta_2$) | Corr($\theta_3$) | Corr($\theta_4$) | Corr($\theta_5$) | Corr($\theta_\Theta$) |

*Fig. 9*

ESTIMATING ORIENTATION ANGLE AND TRANSLATION VALUES OF A SCANNED IMAGE

TECHNICAL FIELD

The described subject matter relates to electronic computing, and more particularly to estimating the orientation angle and translation values of scanned images.

BACKGROUND

Images such as photographs, pictures, logos, etc. may be created using digital rendering techniques, or using analog techniques which may be digitized. Digital images may be stored in a suitable storage medium such as, e.g., a hard disk drive, CD-ROM, etc., and may be transmitted across digital communication networks for viewing and/or printing at remote locations.

In certain applications, e.g., security and counterfeit detection, it may be desirable to compare a scanned copy of a digital image to the original digital image to assess the fidelity of the scanned copy to the original digital image. Because the scanning process is imprecise, the scanned copy may appear rotated about an axis. Also, the image may be displaced, or translated, within the frame captured by the scanned copy. It is desirable to remove this rotation and/or translation before performing a comparison between the scanned copy and the original digital image.

SUMMARY

Implementations described and claimed herein address these and other issues by providing multiple approaches to estimating the orientation angle and translation amount of a scanned image. The approaches may be used independently or in conjunction with one another.

In an exemplary implementation a method is provided. The method comprises filtering a scanned image to obtain a transformed image, wherein the transformed image comprises a series of substantially parallel lines of alternating binary pixel values, and determining an orientation angle of the scanned image using properties of the transformed image.

In another exemplary implementation, a computer-readable medium is provided. The computer readable medium comprises computer-executable instructions that, when executed, direct a computer to remove meaningful image information from a scanned image to generate a transformed image and to determine an orientation angle of the scanned image using the transformed image.

In another exemplary implementation, a method is provided for determining a translation amount between a first image h of size (m×m) and second image z of size (n×n), where m>n. The method comprises computing a correlation value between the second image z and a subimage of the first image h at a plurality of (x, y) coordinate sets of the image h, storing correlation values and the associated (x, y) coordinate set in a suitable memory location, and determining the (x, y) coordinate set that maximizes the correlation value.

In another exemplary implementation, a computer-readable medium is provided. The computer medium has computer-executable instructions that, when executed, direct a computer to determine a translation amount between a first image h of size (m×m) and second image z of size (n×n), where m>n, by performing operations comprising comparing correlation values between the image z and a subimage of the image h at a plurality of (x, y) coordinate sets of the image h, and determining the (x, y) coordinate set that maximizes the correlation value.

In another exemplary implementation, a method of estimating a rotation amount and translation coordinates for a scanned image of a printed copy of an original digital image is provided. The original digital image comprises a logo of known dimensions surrounded by a border of known dimensions. A scanned image is scaled by a sizing factor to create a scaled image that has the same dimensions as the original digital image. The scaled image is rotated through a range of angles. At each rotation angle a rowsum difference vector and a columnsum difference vector are computed, and a threshold is applied to the rowsum vector and the columnsum vector to select a plurality of candidate (x, y) coordinate locations. A correlation value is computed between the scaled image and the original digital image at the plurality of candidate (x, y) coordinate locations, and the (x, y) coordinate location and the rotation angle associated with the maximum correlation value are stored in a memory location. The (x, y) coordinate set and rotation angle associated with the maximum correlation value are selected from the memory location.

In another exemplary implementation a computer readable medium is provided. The computer readable medium has computer executable instructions that, when executed, direct a computer to estimate a rotation amount and translation coordinates for a scanned image of a printed copy of an original digital image. The original digital image comprises a logo of known dimensions surrounded by a border of known dimensions. The scanned image is scaled by a sizing factor to create a scaled image that has the same dimensions as the original digital image. A plurality of correlation values between the original digital image and the scaled, scanned image positioned at a plurality of orientation angles and (x, y) coordinate pairs are calculated and stored in association with the orientation angle and the (x, y) coordinate pair. The (x, y) coordinate set and rotation angle associated with the maximum correlation value are selected.

BRIEF DESCRIPTION OF THE DRAWINGS

FIGS. 8a and 8b are exemplary binary images useful in a correlation procedure for determining the orientation angle δ of FIG. 5;

FIG. 9 is a schematic illustration of an exemplary data structure for storing correlation values;

DETAILED DESCRIPTION

Described herein are exemplary methods for estimating an orientation angle and a translation values for scanned images. The methods described herein may be embodied as logic instructions on a computer-readable medium. When executed on a processor, the logic instructions cause a general purpose computing device to be programmed as a special-purpose machine that implements the described methods.

Exemplary Computing System

Figure 1:
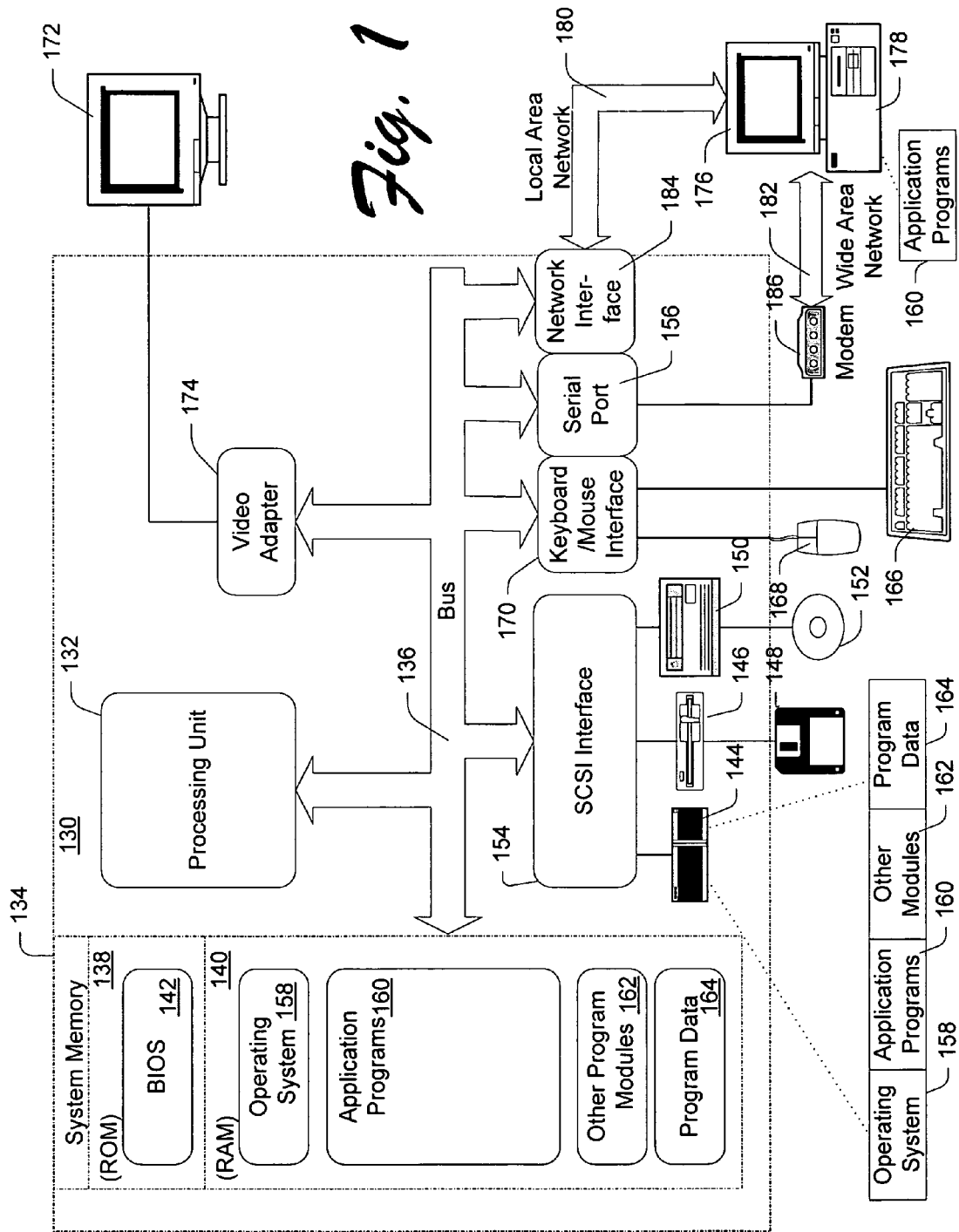
FIG. 1 is a schematic illustration of an exemplary computing device that can be utilized to implement one or more described embodiments.

FIG. 1 is a schematic illustration of an exemplary computing device 130 that can be utilized to implement one or more computing devices in accordance with the described embodiment. Computing device 130 can be utilized to implement various implementations in accordance with described embodiments.

Computing device 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computing device 130, such as during start-up, is stored in ROM 138.

Computing device 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computing device 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computing device 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computing device 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computing device 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computing device 130 is connected to the local network 180 through a network interface or adapter 184. When used in a WAN networking environment, computing device 130 typically includes a modem 186 or other means for establishing communications over the wide area network 182, such as the Internet. The modem 186, which may be internal or external, is connected to the bus 136 via a serial port interface 156. In a networked environment, program modules depicted relative to the computing device 130, or portions thereof, may be stored in the remote memory storage device. It will be appreciated that the network connections shown are exemplary and other means of establishing a communications link between the computers may be used.

Generally, the data processors of computing device 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

Exemplary Images

Figure 2:
FIG. 2 is an exemplary image.

FIG. 2 is a schematic illustration of an exemplary image 200. Solely for the purposes of illustration, it will be assumed that the digital image 200 is a logo which may include one or more watermarks. The image 200 may be encoded as a digital image and stored in a suitable storage medium, e.g., as a matrix of values, or of arrays of values. Rendering algorithms may be used in combination with a suitable processing device to display the image 200.

Figure 3:
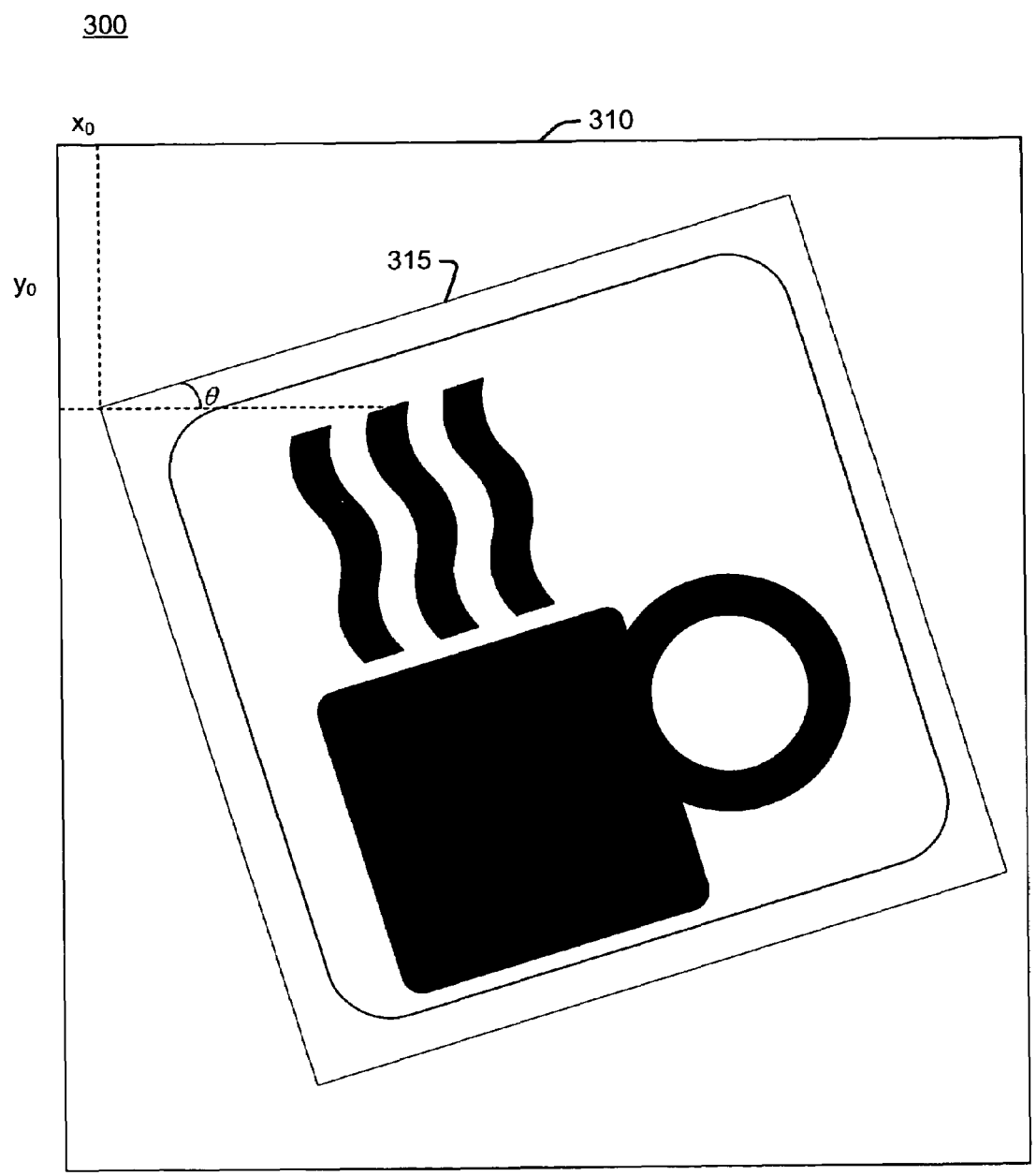
FIG. 3 is a scan of the image of FIG. 2.

FIG. 3 is a schematic illustration of a scanned copy of the image 200 of FIG. 2. The scanned copy 300 captures a frame 310 of information that includes a scanned copy of the digital image 315. The scanned copy of the digital image 315 is offset from the upper left-hand corner of the frame 310 by an amount $x_0$ along the X axis of frame 315 and by an amount $y_0$ along the Y axis of frame, 315. Also, the scanned copy of the digital image 315 is rotated by an angle, θ, about a Z axis. The process assumes that the center for rotation approximates the center of the scanned image approximately, or that center of rotation is known.

Estimating Rotation Angle

In exemplary embodiments, the orientation angle, θ, is estimated by removing meaningful image information from the scanned image to obtain a transformed image that comprises a series of parallel lines of alternating binary values. Removing meaningful image information from the scanned image implies that the shape (or area, size, etc) of the halftone dot information imparted by the printing process should be removed, leaving only the information about the average spacing between halftone dot matrices. This average spacing information is strictly dependent on the orientation and parameters of printing & scanning process and independent of the grayscale information conveyed by the halftone dots. The orientation angle, θ, may be determined using properties of the binary values of the average spacing.

In an exemplary embodiment, meaningful image information can be removed from the scanned image Y by applying a linear shift invariant filter to the image. Assuming that the original 40×40 image was printed as a square of 0.5 inches and scanned at a resolution of 600 dpi, the corresponding resolution is (600*0.5)/40=7.5 lines per image pixel. Two linear shift invariant filters have proven useful in removing meaningful image information from the scanned image when the scanning is performed at the resolution of 600 dpi. The first linear shift invariant filter has an impulse given by:

$$h1 = C \begin{bmatrix} 1 & 1 & 1 & 1 & 1 \\ 1 & 0 & 0 & 0 & -1 \\ 1 & 0 & 0 & 0 & -1 \\ 1 & 0 & 0 & 0 & -1 \\ -1 & -1 & -1 & -1 & -1 \end{bmatrix}$$

The second linear shift invariant filter has an impulse response given by:

$$h2 = C \begin{bmatrix} 1 & 1 & 1 & 1 & 1 \\ -1 & 0 & 0 & 0 & 1 \\ -1 & 0 & 0 & 0 & 1 \\ -1 & 0 & 0 & 0 & 1 \\ -1 & -1 & -1 & -1 & -1 \end{bmatrix}$$

In applying the linear shift invariant filters, C is chosen to be a large constant. Empirically, a constant C=32 proved effective when the linear shift invariant filters were applied iteratively over five iterations. It will be appreciated that C may take on values other than 32. For different scanning resolutions and processes, other shift-invariant filters may also be useful. Furthermore, even for this scanning resolution we are considering (i.e., 600 dpi), the presented filters are exemplary and other shift invariant filters may also produce equivalently useful results. These filters were derived as a result of a series of experiments.

More generally, assume an original image S of dimensions (n×n) is printed to a square of dimensions (l×l). The printed image is scanned to generate an image X, scanned at a resolution of P dots per inch. Hence, the scanned image X will have dimensions of (l·P×l·P).

Figure 4:
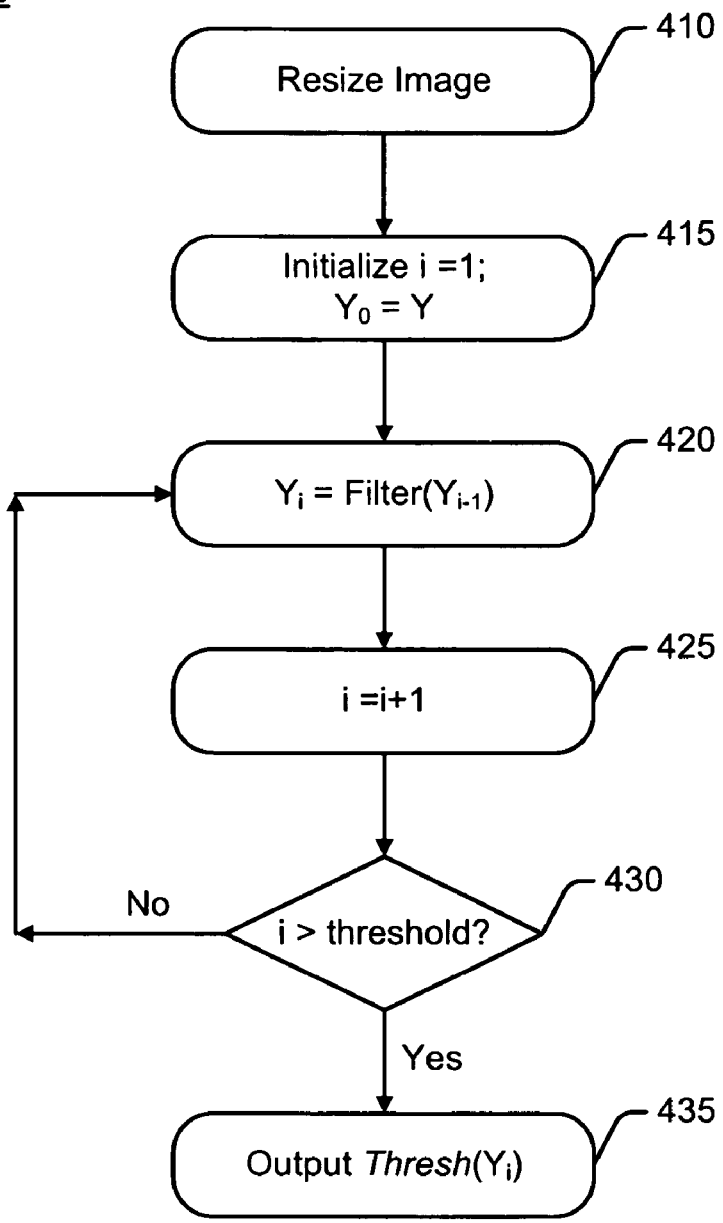
FIG. 4 is a flowchart illustrating operations in an exemplary procedure for removing meaningful image information from a scanned image.

FIG. 4 is a flowchart illustrating operations 400 in an exemplary procedure for removing meaningful image information from a scanned image X. At operation 410, the scanned image X is resized to obtain an image resolution of 7.5 lines per image pixel. Thus, an image Y may be computed by resizing X by a factor of (l·P)/(n·7.5), such that the image Y has an image resolution of 7.5 lines per image pixel.

Next, the linear shift invariant filters are applied iteratively to the image Y. Hence, at operation 415, a counter i is initialized to zero, and $Y_0$ is initialized to Y. At operation 420, $Y_i$ is computed by filtering $Y_{i-1}$ by a two-dimensional linear shift having an impulse response of h, as set forth above (i.e., either h1 or h2). At operation 425, i is incremented and at operation 430 it is determined whether i is less than the desired number of iterations. If i is less than the desired number of iterations, then control passes back to operation 420 and the linear shift invariant filter is applied again. By contrast, if i is greater than or equal to the number of iterations, then $Y_i$ is considered to be the output of the iterative portion of the proposed algorithm. Once the output of the iterative portion (i.e. $Y_i$) is computed, then we apply thresholding operation to $Y_i$ and produce Thresh($Y_i$); here Thresh(.) (given in 435) is the thresholding operator. Thresh($Y_i$) is the output of the algorithm; it is a binary image. The threshold value used in Thresh(.) is chosen as mean of pixel values currently. Other threshold values may also prove to produce equivalent results.

Figure 5:
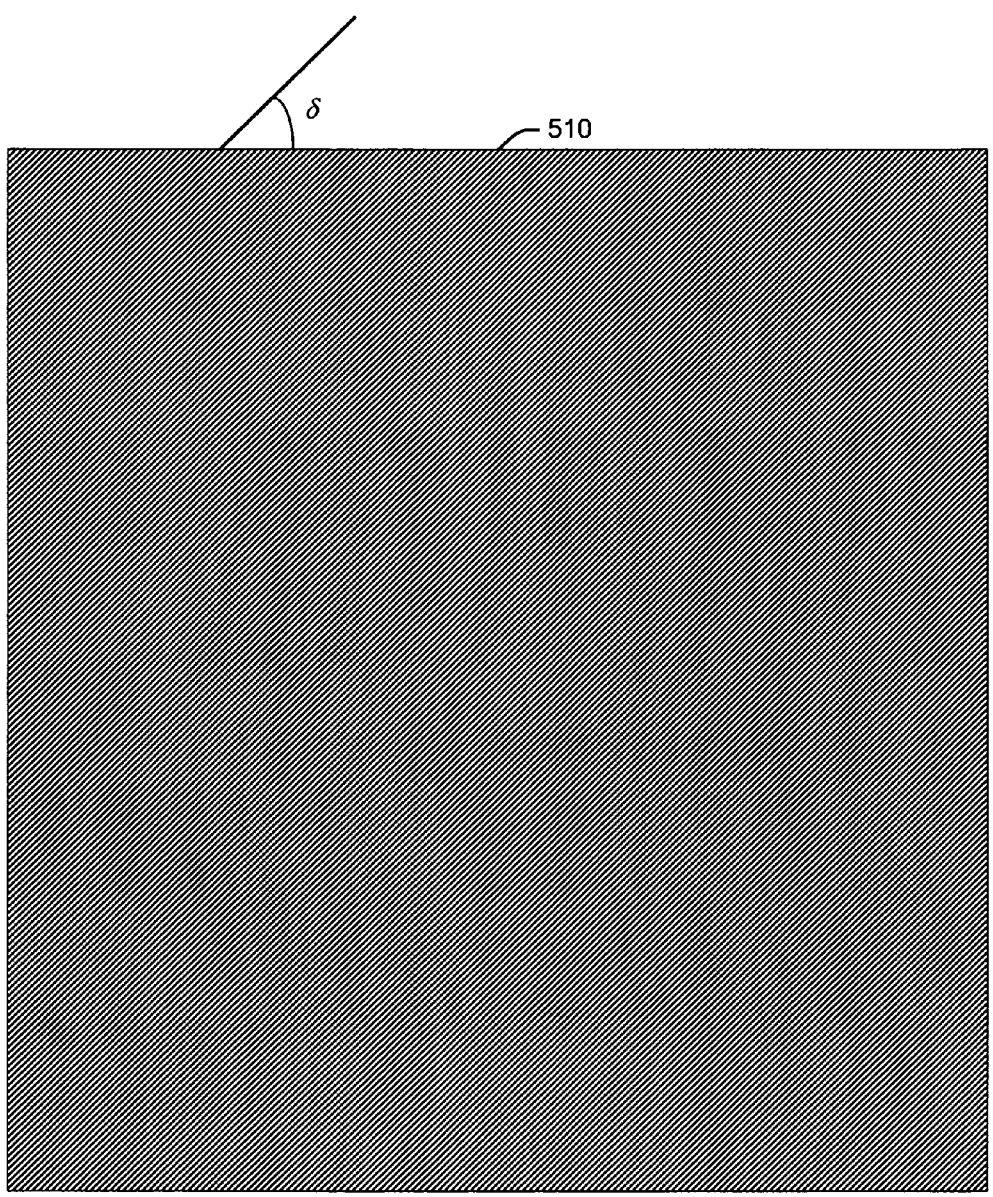
FIG. 5 is a schematic illustration of a translation Y of a scanned image X in which meaningful image information has been removed.

In practice, the operations of FIG. 4 may be performed with each of the linear shift invariant filters h1 and h2, and the better result selected. FIG. 5 is a schematic illustration of a translation Y 510 of a scanned image X in which meaningful image information has been removed by applying a linear shift invariant filter to the image X. The result is an image Y of size (N×M), wherein each pixel Y(i,j) is a binary value indicating whether the pixel should be represented by black or white. The resulting visible image 510 is a series of approximately alternating, parallel black and white lines offset from a horizontal axis by an orientation angle δ.

Figure 6A:
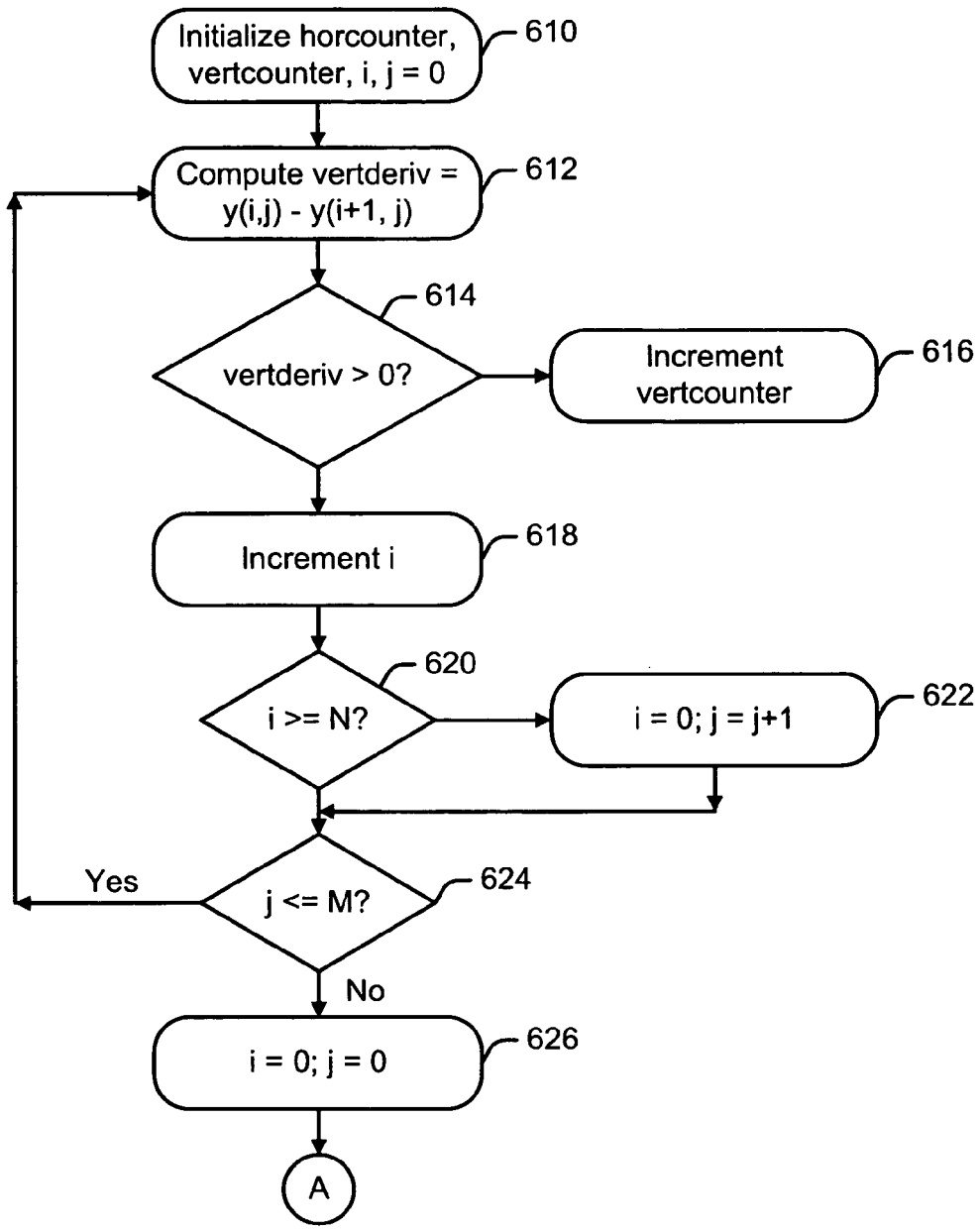
FIGS. 6a-6b are flowcharts illustrating operations in an exemplary procedure for determining the orientation angle δ of FIG. 5.
Figure 6B:
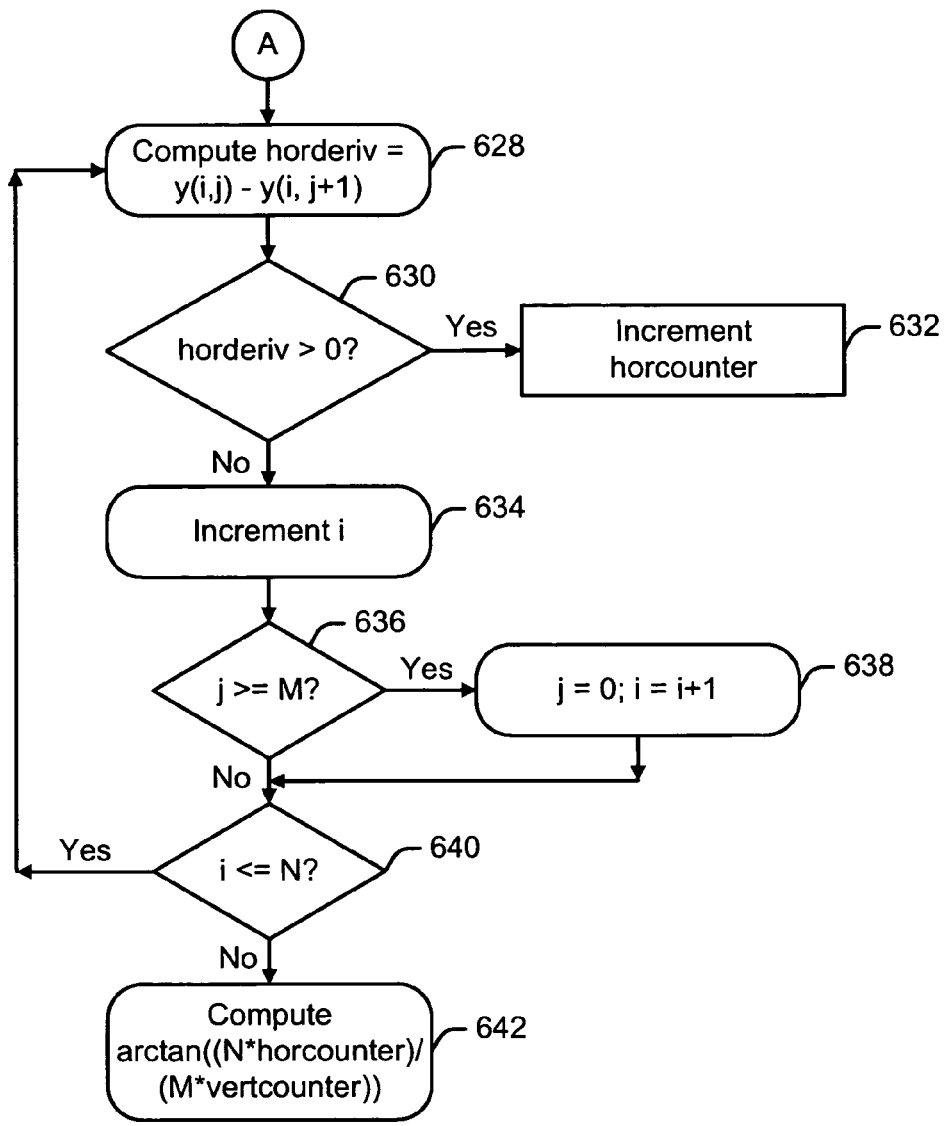

FIGS. 6a-6b are a flowchart illustrating operations 600 in an exemplary procedure for determining the orientation angle δ. Conceptually, the operations 600 of FIGS. 6a-6b rely on basic trigonometry to determine the orientation angle δ. The first order differences of adjacent pixels along rows of the image Y is determined. The number of places in which the first order differences of adjacent pixels is non-zero is divided by the total number of pixels in a row to determine the approximate period of change in the row (i.e., the approximate average spacing between halftone matrix dots). Similarly, the first order differences of adjacent pixels along columns of the image Y are determined. The number of places in which the first order differences of adjacent pixels is non-zero is divided by the total number of pixels in a column to determine the approximate period of change in the column. The orientation angle δ may be determined as the arctangent of the period of change in the row divided by the period of change in the column.

Referring to FIG. 6a, at operation 610 variables horcounter, vertcounter, i, and j are all initialized to zero. At operation 612 the variable vertderiv=Y(i,j)−Y(i+1, j) is computed. At operation 614 it is determined whether vertderiv is greater than zero. If vertderiv is greater than zero, then control passes to operation 616 and vertcounter is incremented by 1. Control then passes to operation 618 and the counter i is incremented by 1. At operation 620 it is determined whether i is greater than or equal to N (here N is the number of rows in the image, i.e. the height of the image Y), and if so then control passes to operation 622 where the counter i is reset to zero and the counter j is incremented by 1. At operation 624 it is determined whether j is less than or equal to M (here M is the number of columns in the image, i.e. the width of the image Y), and if so then control passes back to operation 612 and vertderiv is computed with an incremented counter i. After executing operations 612 through 624, vertcounter will be incremented to the sum over all the columns of the image Y of the number of times vertderiv was greater than zero.

If, at operation 624, j is not ≦M, then control passes to operation 626 and the variables i and j are reset to zero. At operation 628 (FIG. 6b) the variable horderiv=Y(i, j)−Y(i, j+1) is computed. At operation 630 it is determined whether horderiv is greater than zero. If horderiv is greater than zero, then control passes operation 632 and horcounter is incremented by 1. Control then passes to operation 634 and the counter j is incremented by 1. At operation 636 it is determined whether j is greater than or equal to M, and if so then control passes to operation 638 and the counter i is incremented by 1. At operation 640 it is determined whether i is less than or equal to N, and if so then control passes back to operation 628 and horderiv is computed with an incremented counter j. After executing operations 628 through 640, horcounter will be incremented to the sum over all the rows of the image Y of the number of times horderiv was greater than zero.

At operation 642 the orientation angle δ may be determined as the arctan((horcounter*N)/(vercounter*M)), since the average spacing along the columns (i.e., the vertical period of the alternating binary lines) is N/vercounter and the average spacing along the rows (i.e., the horizontal period of the alternating binary lines) is M/horcounter. Assuming the orientation angle δ is the sum of a printing angle α plus a rotation angle θ introduced during the scanning process, the rotation angle θ may be determined by subtracting the printing angle α from the orientation angle δ. In many instances, the printing angle α is known.

In an alternate embodiment a correlation-based pattern matching technique is implemented to estimate an orientation angle δ. Conceptually, the technique generates a plurality of images, each of which has a line oriented at an angle of ϵ degrees, and overlays the images at randomly chosen coordinates on the translated image Y. Correlations between the images and the translated image Y are calculated and averaged for each angle ϵ, where ϵ is varied in increments between a lower limit and an upper limit. The angle ϵ that produces the maximum correlation is selected as the orientation angle δ.

Figure 7A:
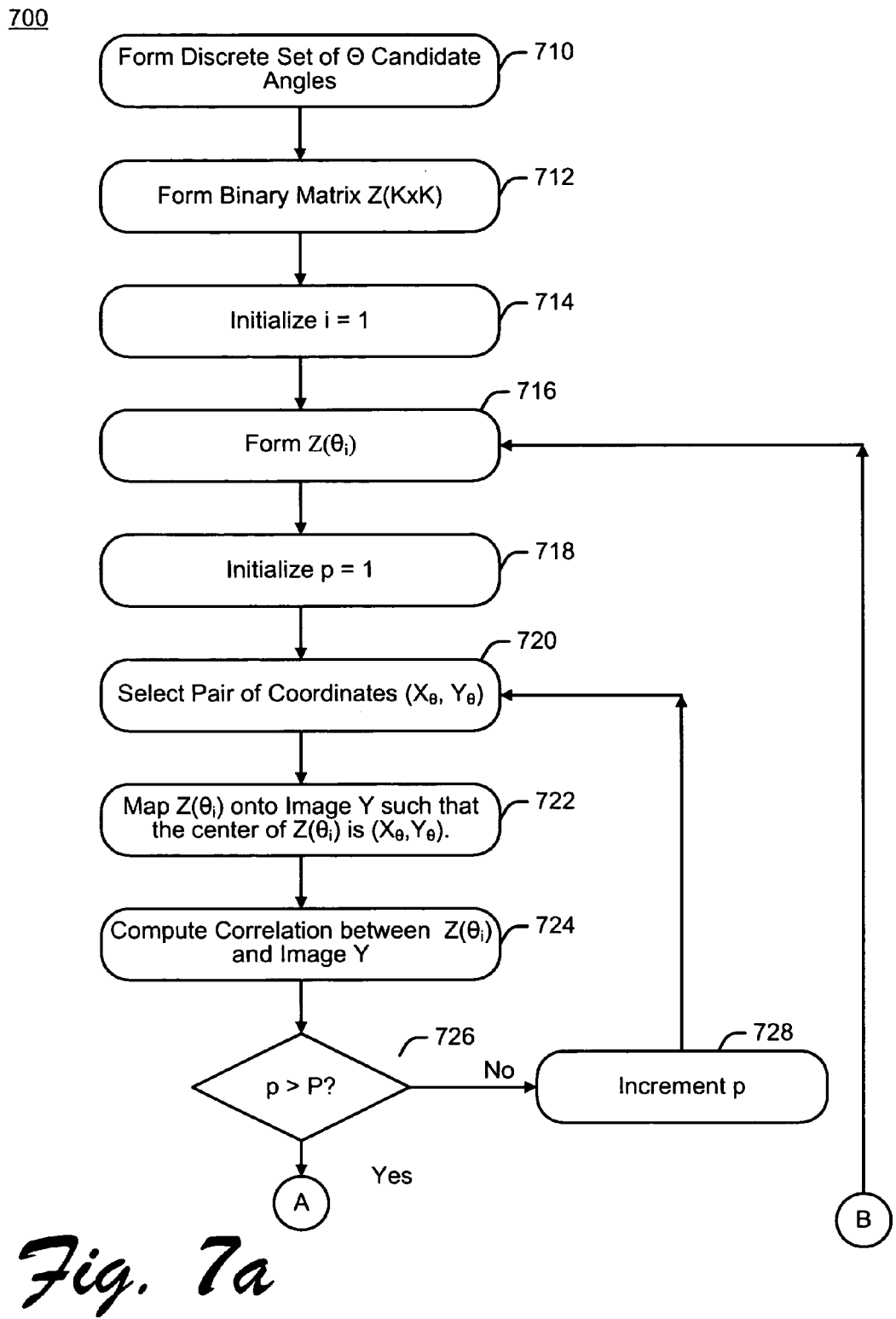
FIGS. 7a-7b are flowcharts illustrating operations in an exemplary procedure for determining the orientation angle δ of FIG. 5.
Figure 7B:
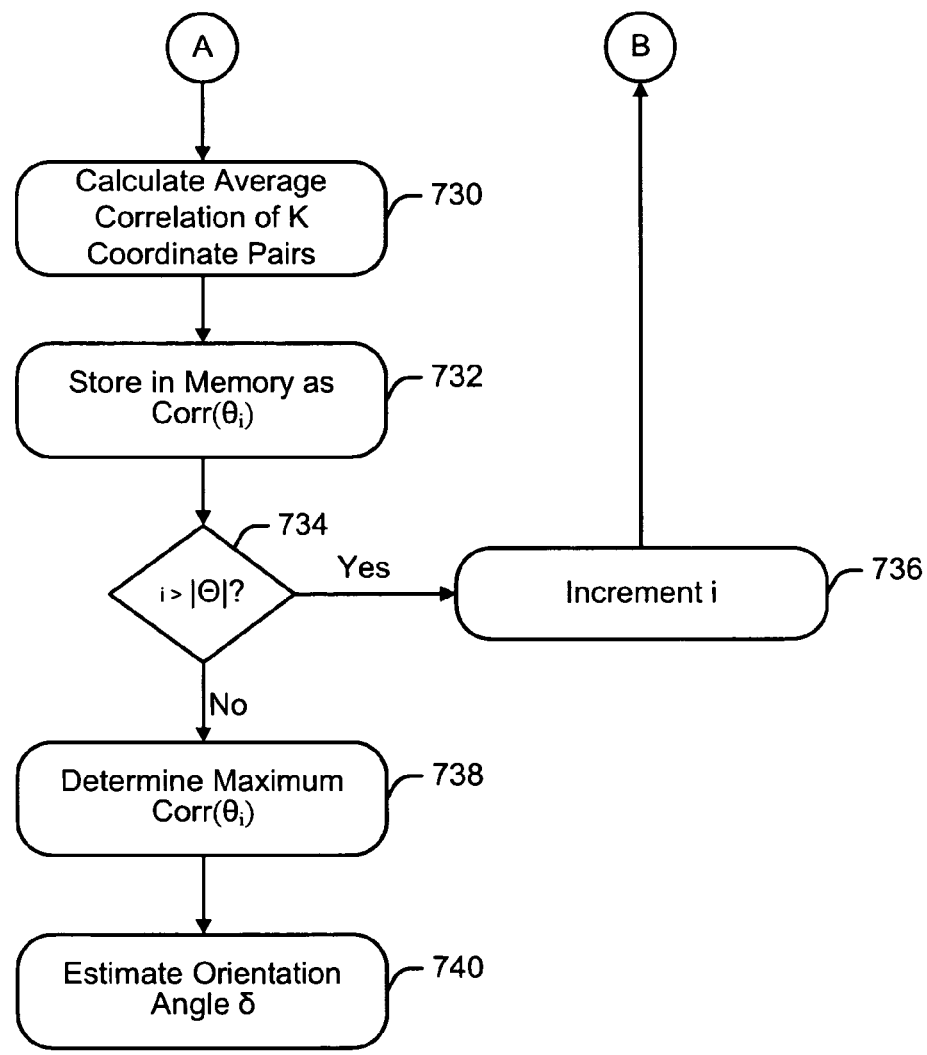

FIGS. 7a-7b are a flowchart illustrating operations 700 in another exemplary procedure for determining the orientation angle δ. At operation 710 a discrete set of candidate angles, Θ, is formed. In an exemplary embodiment, the candidate set of angles may range from −90° to 90°; in alternate embodiments the candidate set of angles may range from −45° to 45°. Not only these lower and upper limits, but also the increment amounts that are used for forming Θ is an algorithm parameter and user-dependent; the increment amounts can be uniform or non-uniform. At operation 712 binary image Z of size (k×k) is formed. Binary image Z is characterized by K−1 rows of a first binary value and a single row of a second binary value, different from the first. In one exemplary embodiment, depicted in FIG. 8a, binary image Z is characterized by K−1 rows of binary zeros and a single row of binary ones. In another exemplary embodiment, depicted in FIG. 8b, binary image Z is characterized by K−1 rows of binary ones and a single row of binary zeros. The correlation process described herein does not require the binary image Z to have only a single row of binary ones (or zeros); it will work with multiple rows of binary ones (or zeros), or even with rows that are only predominately filled with zeros or ones. Furthermore, the image Z can also be formed from an alphabet whose cardinality is larger than 2 (i.e., we can use more than 2 elements in forming the image, we can use a properly chosen ternary Z, etc). However, the procedure is experimentally found to be the most efficient and producing the strongest correlation when a single row of Z is composed entirely binary ones (or zeros) and the remaining rows are composed entirely of binary zeros (or ones).

At operation 714 a counter i is initialized to 1. At operation 716 an image $Z(\theta_i)$ of size (K×K) is formed by rotating the image Z by an angle of $\theta_i$ degrees. Here $\theta_i$ is the i-th entry of the set Θ. By way of example, if the candidate set of angles ranges from −90° to 90° and $\theta_i$ is incremented in 1° increments, then $\theta_1$ is −90°, $\theta_2$ is −89°, and so on.

At each angle $\theta_i$, a series of P pairs of coordinates ($x_\theta$, $y_\theta$) are randomly chosen. The number of such randomly chosen coordinates (i.e., P) as well as the distribution from which they are chosen are user-dependent algorithm parameters; currently we choose them from the uniform distribution. For each of the chosen coordinates ($x_\theta$, $y_\theta$), the image $Z(\theta_i)$ is overlaid on the image Y such that the center of $Z(\theta_i)$ (i.e., its center of gravity) is at ($x_\theta$, $y_\theta$) and the correlation between $Z(\theta_i)$ and Y is computed via finding the inner-product of them. The P correlations are averaged and stored in a memory location as a correlation value associated with the angle $\theta_i$. This procedure is reflected in operations 718 through 728. The value of P may be predetermined and fixed, or may be selected dynamically during operation. Increasing P increases the accuracy of the algorithm, but also increases the computational expense of the algorithm. Accordingly, a selection of P may reflect a balancing of these factors.

At operation 718 a counter, p, is initialized to one. At operation 720 a set of coordinates ($x_\theta$, $y_\theta$) are randomly selected. In an exemplary embodiment $x_\theta$ is randomly selected from a set of values {0, 1, 2, . . . , M−K+1}. Similarly, $y_\theta$ is randomly selected from a set of values {0, 1, 2, . . . , N−K+1}. At operation 722 the image $Z(\theta_i)$ is overlaid on the image Y such that the center of $Z(\theta_i)$ is the selected coordinate set ($x_\theta$, $y_\theta$). At operation 724, a correlation between the intersection of the image $Z(\theta_i)$ and Y is computed. In an exemplary embodiment, the correlation may be the inner product of the two matrices. At operation 726, it is determined whether the counter p is greater than a threshold, P, the desired number of coordinate pairs. If p is less than P, then control passes to operation 728 where p is incremented, and then control passes back to operation 720. By contrast, if, at operation 726, p is greater than P, then control passes operation 730 and the average correlation of the P coordinate pairs is calculated and stored in a memory location associated with the angle $\theta_i$ (operation 732). FIG. 9 is a schematic illustration of an exemplary data structure 900 for storing correlation values. Data structure 900 may be implemented as a two dimensional array in which, for each value of the counter i, the angle $\theta_i$ is associated with the average correlation calculated in operation 730. At operation 734 it is determined whether i is greater than |Θ| (where |Θ| denotes the cardinality of set Θ), and if not then i is incremented at operation 736 and control passes back to operation 716.

By contrast, if, at operation 734, i is greater than |Θ|, then control passes to operation 738 and the maximum correlation value calculated in operations 716 through 736 is determined. If the correlation values are stored in an array of correlation values as depicted in FIG. 9, then the maximum value of Corr($\theta_i$) in the data structure is selected.

At operation 740 the angle $\theta_i$ associated with the maximum value of corr($\theta_i$) is assigned to the orientation angle $\delta$. Again, assuming the orientation angle $\delta$ is the sum of a printing angle $\alpha$ plus a rotation angle $\theta$ introduced during the scanning process, the rotation angle $\theta$ may be determined by subtracting the printing angle $\alpha$ from the orientation angle $\delta$.

The particular data structure depicted in FIG. 9 is merely exemplary, and is not critical to implementing the invention. For example, in an alternate embodiment only the correlation values are stored in an array in memory and the angle $\theta_i$ may be computed when the maximum value of corr($\theta_i$) is determined. In another embodiment only a single value of corr($\theta_i$) is stored in memory. Each time a new value of corr($\theta_i$) is computed, it is compared to the stored value of corr($\theta_i$), and the larger of the values is stored in memory. Thus, after all the values of corr($\theta_i$) have been computed the memory location will hold the largest value of corr($\theta_i$). These and other implementations are within the scope of the attached claims.

Estimating Translation Amount

Referring back to FIG. 3, once the rotation angle $\theta$ of a scanned image has been determined, the scanned image can be rotated back to remove the rotation angle from the scanned image. After the rotation angle is removed from the scanned image, the coordinates ($x_0$, $y_0$) that represent the displacement along the X and Y axes, respectively, of the scanned image from the original image can be determined. The following description assumes that the scanned image has been rotated to remove the rotation angle $\theta$ from the scanned image.

Figure 10:
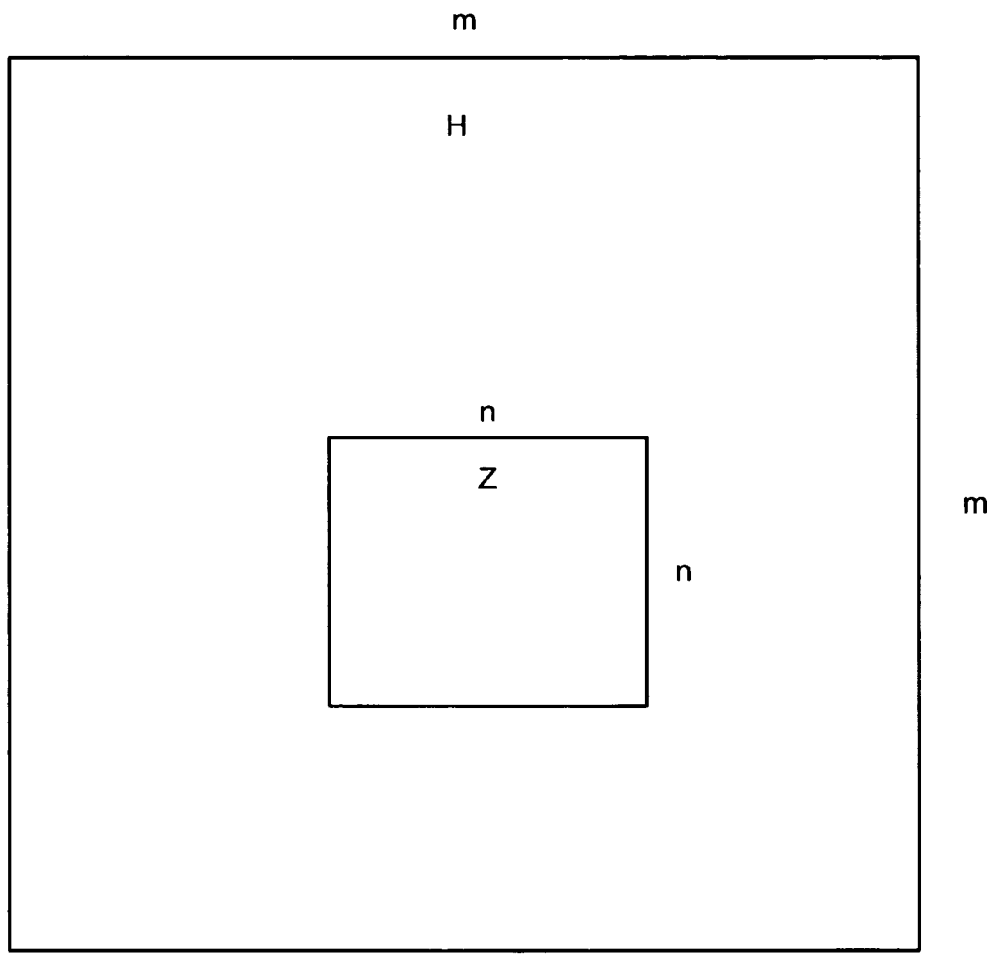
FIG. 10 is a schematic illustration of the technical problem of estimating the translation amount of a scanned image.

FIG. 10 is a schematic illustration of the technical problem of estimating the translation amount of a scanned image. For purposes of description, the problem is simplified as follows. The original image is referred to as the host image H of size (m×m). Another image z (i.e., the scanned image) of size (n×n) is overlaid onto H. Using the format a(i, j) to denote the (i, j)-th pixel of an image a, the relationship between the host image H and the image z is given by:

$$H(x_0+i, y_0+j)=z(i,j) \quad \text{Equation (1)}$$

In Equation (1), $i \leq 1 \leq n$, and $j \leq 1 \leq n$. Using this notation, the coordinates ($x_0$, $y_0$) represent the displacement (i.e., the translation amount that we would like to estimate) along the X and Y axes, respectively, of the image z from the image H.

Several assumptions are made for the purpose of simplifying this description. First, the image H is assumed to be of size (m×m) and the image z is assumed to be of size (n×n). Assuming H and z are square simplifies the description of these techniques. However, the techniques work equally well when neither H nor z are squares. Hence, the description of H as size (m×m) and the description of z as size (n×n) are not intended to limit the geometry of these images to squares. The nomenclature (m×m) and (n×n) should be construed to include non-square rectangles. In addition, this description assumes that n≦m, i.e., that the image z can be embedded entirely within the image H. This assumption simplifies the description of these techniques. However, similar techniques can be applied when n>m. Accordingly, nothing in this description should be construed as limiting n to a value less than or equal to m.

One exemplary technique, referred to as the oracle method, involves positioning the image z at each coordinate set (i, j) of the image H that permits z to remain within the limits of H and determining a correlation between z and a sub-image h of the image H that is the same size as the image Z. The coordinate set (i, j) that results in the maximum correlation between h and Z is selected to represent the x and y offset coordinates ($x_0$, $y_0$). The sub-image h (of size n×n) of H may be defined as follows:

$$h^{(t,u)}(i,j) = h(t+i, u+j) \quad \text{Equation (2)}$$

In Equation (2), $i \leq 1 \leq n$, and $j \leq 1 \leq n$.

The oracle method estimates the offset coordinates ($x_0$, $y_0$) using the following equation:

$$(\hat{x}_0, \hat{y}_0) = \operatorname{argmin}_{(t,u) \in S^2} \sum_{i=1}^{n} \sum_{j=1}^{n} [h^{(t,u)}(i,j) - z(i,j)]^2 \quad \text{Equation (3)}$$

Figure 11:
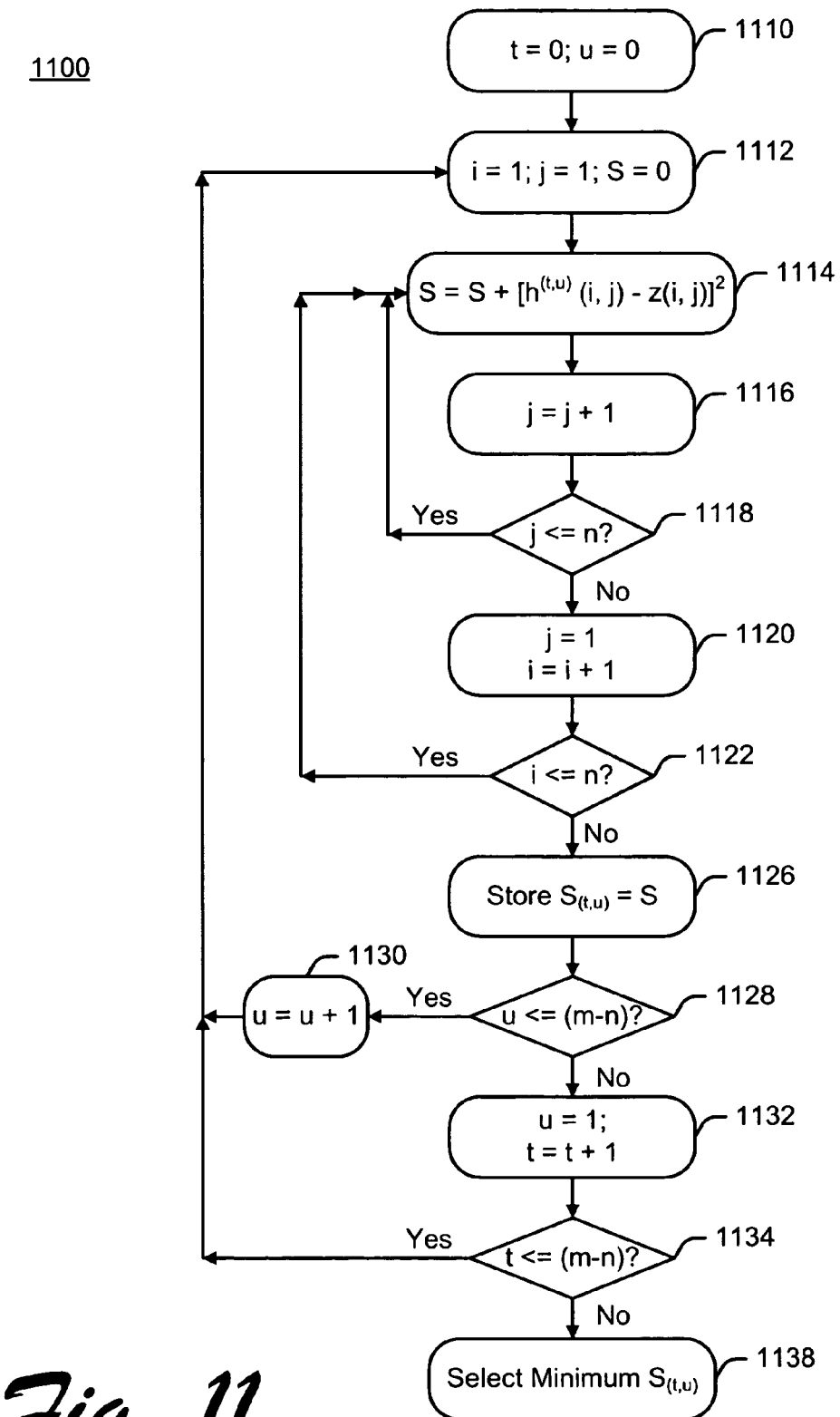
FIG. 11 is a flowchart illustrating first exemplary operations for correlating a first image and a second image.

In equation (3), S={0, 1, 2, . . . ,(m−n)}. FIG. 11 is a flowchart illustrating exemplary operations 1100 for implementing the oracle method. At operation 1110 the counters t and u are initialized to zero, and at operation 1112 the counters i and j are initialized to one, and S is initialized to zero. At operation 1114 S updated to:

$$S = S + [h^{(t,u)}(i,j) - z(i,j)]^2 \quad \text{Equation (4)}$$

At operation 1116, j is incremented. At operation 1118 it is determined whether j is less than or equal to n, and if so, then control passes back to operation 1114, and S is recomputed with an updated j. By contrast, if j is greater than n, then control passes to operation 1120, where j is initialized to 1 and i is incremented. At operation 1122, it is determined whether i is less than or equal to n, and if so then i is incremented at operation 1124 and control passes back to operation 1114, where S is recomputed with an updated i.

By contrast, if at operation 1122 i is greater than n, then control passes to operation 1126 and $S_{(t,u)}$ is stored in a suitable memory location. At operation 1128 it is determined whether u is less than or equal to (m−n), and if so then u is incremented and control passes to operation 1112, where i, j, and S are re-initialized. By contrast, if u is greater than (m−n), then control passes to operation 1132, where u is initialized to 1 and t is incremented.

At operation 1134, it is determined whether t is less than or equal to (m−n), and if so then control passes to operation 1112. If, at operation 1134 t is greater than (m−n), then control passes to operation 1138, where the minimum $S_{(t,u)}$ is selected.

The oracle method, while accurate, is computationally expensive. Accordingly, exemplary embodiments implement approximations of the oracle method that are computationally less expensive. One exemplary embodiment computes the $L^2$ norm between subsamples of h(t,u) and z in which local averaging is used to reduce the size of the subsamples, thereby reducing the computation complexity associated with computing the oracle method.

Assuming an image a, a subsampled image ã may be computed using the following equation:

$$\tilde{a}(i,j) = \frac{1}{p^2} \sum_{t=(p-1)i+1}^{pi} \sum_{u=(p-1)j+1}^{pj} a(t,u) \quad \text{Equation (5)}$$

Figure 12:
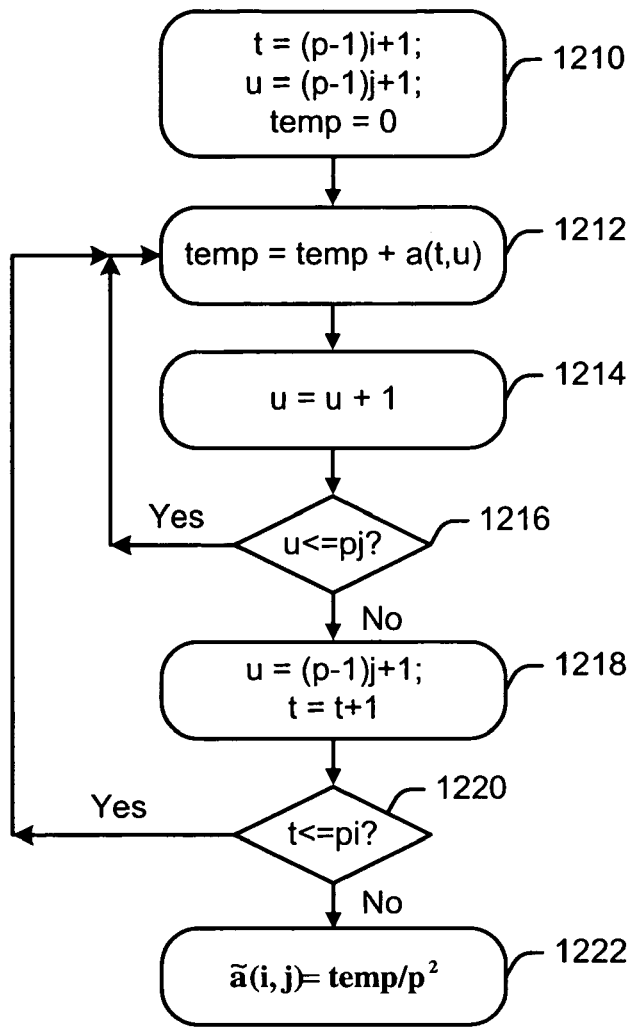
FIG. 12 is a flowchart illustrating second exemplary operations for correlating a first image and a second image.

Equation (5) assumes that the size of the image a is divisible by p, such that the size of the image ã is equal to the size of a divided by p. FIG. 12 is a flowchart illustrating exemplary operations for implementing Equation (5). At operation 1210, the counter t, u, and temp are initialized. At operation 1212, temp is incremented, and at operation 1214 u is incremented. At operation 1216, it is determined whether u is less than or equal to p·j, and if so then control passes back to operation 1212. The loop comprising operations 1212-1216 is repeated until u is greater than p·j, whereupon u is reset to (p−1)·j+1 and t is incremented. At operation 1220, it is determined whether t is less than or equal to p·i, and if so then control passes back to operation 1212. The loop of operations 1212-1220 is repeated until t is greater than p·i, whereupon control passes to operation 1222, where ã(i, j) is assigned the value of temp divided by $p^2$.

Once the subsampled images of $h^{(t,u)}$ and z are computed, the offset coordinates $(\hat{x}_0, \hat{y}_0)$ may be computed using these subsampled images (which consist of local averages). In an exemplary embodiment, the images $h^{(t,u)}$ and z are locally averaged over a block size p that divides n such that n=p·k, resulting in subsampled images $\tilde{z}$ and $\tilde{h}$. The value k may be selected as a function of the smoothness of the digital image. As the variation between pixels in the digital image increases, the logical choice of the value of k may decrease. In general, the value of k is a user-determined algorithm parameter. The value of k may be determined empirically. The offset coordinates $(\hat{x}_0, \hat{y}_0)$ may be computed using the following equation:

$$(\hat{x}_0, \hat{y}_0) = \mathrm{argmin}_{(t,u)\in S^2} \sum_{i=1}^{k}\sum_{j=1}^{k} \left[\tilde{h}^{(t,u)}(i,j) - \tilde{z}(i,j)\right]^2 \quad \text{Equation (6)}$$

Figure 13:
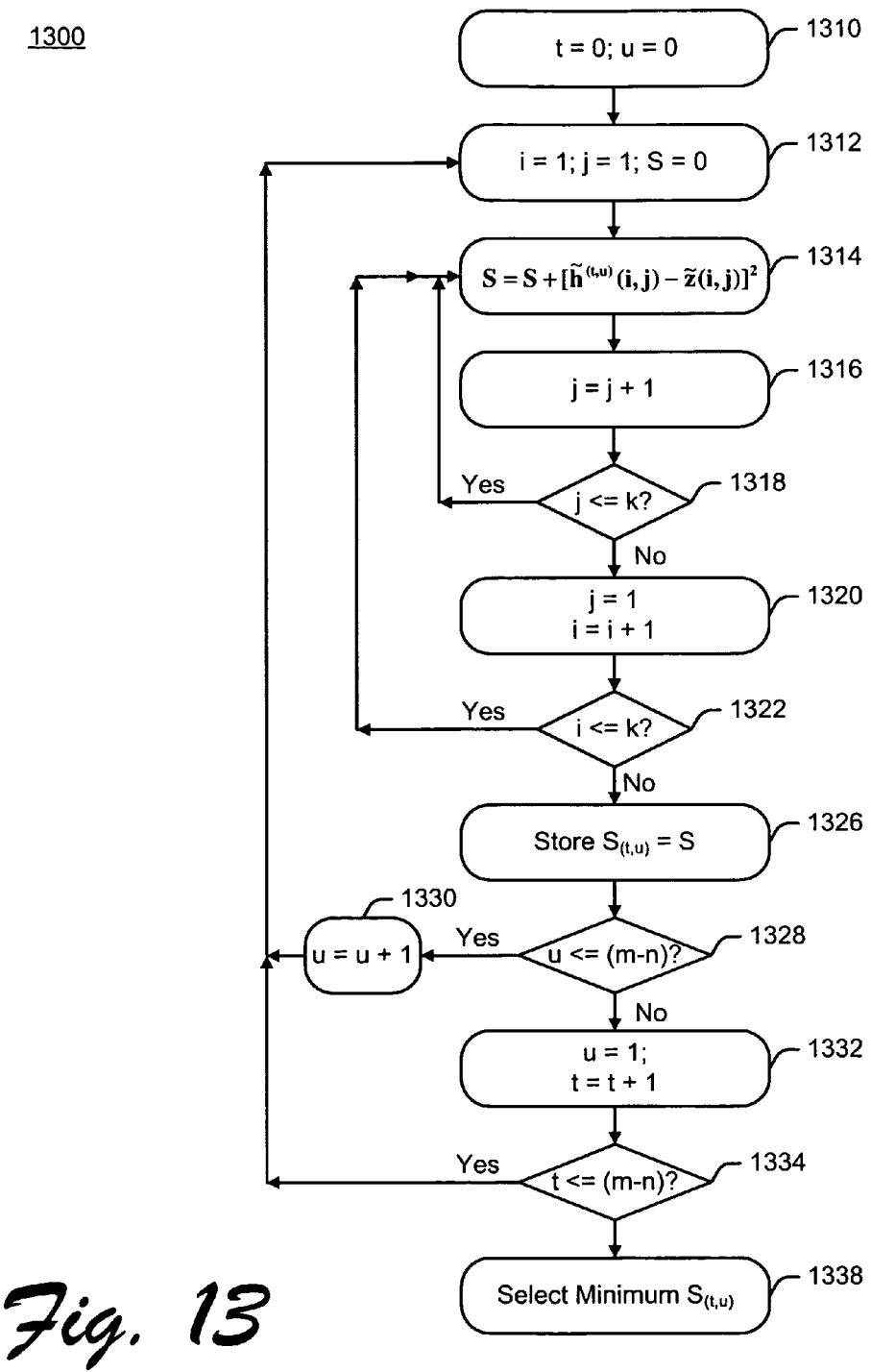
FIG. 13 is a flowchart illustrating third exemplary operations for correlating a first image and a second image.

FIG. 13 is a flowchart illustrating exemplary operations for implementing Equation (6), which essentially implements the oracle method on the locally averaged derivative images $\tilde{h}$ and $\tilde{z}$. Referring to FIG. 13, at operation 1310, counters t and u are initialized to zero, and at operation 1312 counters i and j are initialized to 1, and S is initialized to zero. At operation 1314, S is updated to:

$$S = S + [\tilde{h}^{(t,u)}(i,j) - \tilde{z}(i,j)]^2 \quad \text{Equation (7)}$$

At operation 1316, j is incremented and at operation 1318 it is determined whether j is less than or equal to k, and if so then control passes back to operation 1314, and S is updated with the incremented value of j. The loop comprising operations 1314 through 1318 is repeated until, at operation 1318, j is greater than k, whereupon control passes to operation 1320, where j is reset to 1 and i is incremented.

At operation 1322 it is determined whether i is less than or equal to k, and if so then control passes back to operation 1314, where S is updated. By contrast, if at operation 1322 i is greater than k then control passes to operation 1326 and the value of S is stored in a suitable memory location as $S_{(t,u)}$. At operation 1328 it is determined whether u is less than the value of (m−n), and if so then control passes to 1330, where u is incremented. Control then passes back to operation 1312, where i, j, and S are reset. The loop comprising operations 1312 through 1328 is repeated until u is greater than the value of (m−n), at which point control passes to operation 1332, where u is reset to 1 and t is incremented.

At operation 1334 it is determined whether t is less than the value of (m−n), and if so then control passes back to operation 1312. The loop comprising operations 1312 through 1334 is repeated until t is greater than the value of (m−n), whereupon control passes to operation 1338, and the minimum value of $S_{(t,u)}$ is selected.

In an exemplary embodiment, the values of $S_{(t,u)}$ stored in memory in operation 1326 may be stored in an array. Thus, the operation of selecting the minimum value of $S_{(t,u)}$ stored in memory may be implemented by scanning the array for the minimum value of $S_{(t,u)}$. In an alternate embodiment, a single memory location may be used and operation 1326 compares each S to the stored value of $S_{(t,u)}$ and saves the value of S in memory only if the value of S is less than the value of $S_{(t,u)}$.

In another exemplary embodiment, subsampled versions of h and z are used to estimate the translation parameters ($x_0$, $y_0$) to reduce the overall possibilities of ($x_0$, $y_0$) to be evaluated. Given an integer p that evenly divides both n and m, such that n=p·k and m=p·l, a subsampled version of h may be computed as $\tilde{h}$ of size (l×l) and a subsampled version of z may be computed as $\tilde{z}$ of size (k×k) using the averaging-based resizing technique given in Equation (5). The approximation may then be computed in two steps. The first step uses the oracle method to find the coordinates $(\hat{x}_{10}, \hat{y}_{10})$ in the $\tilde{h}$, $\tilde{z}$ domain that produce the maximum correlation between the subsampled images. The coordinates $(\hat{x}_{10}, \hat{y}_{10})$ define a region in the h, z domain to search for the coordinates that produce the maximum correlation between the images h and z.

The first step may be expressed as finding the coordinates $(\hat{x}_{10}, \hat{y}_{10})$ that solve the following equation:

$$(\hat{x}_{10}, \hat{y}_{10}) = \mathrm{argmin}_{(t,u)\in S^2} \sum_{i=1}^{n}\sum_{j=1}^{n} \left[\tilde{h}^{(t,u)}(i,j) - \tilde{z}(i,j)\right]^2 \quad \text{Equation (8)}$$

Figure 14:
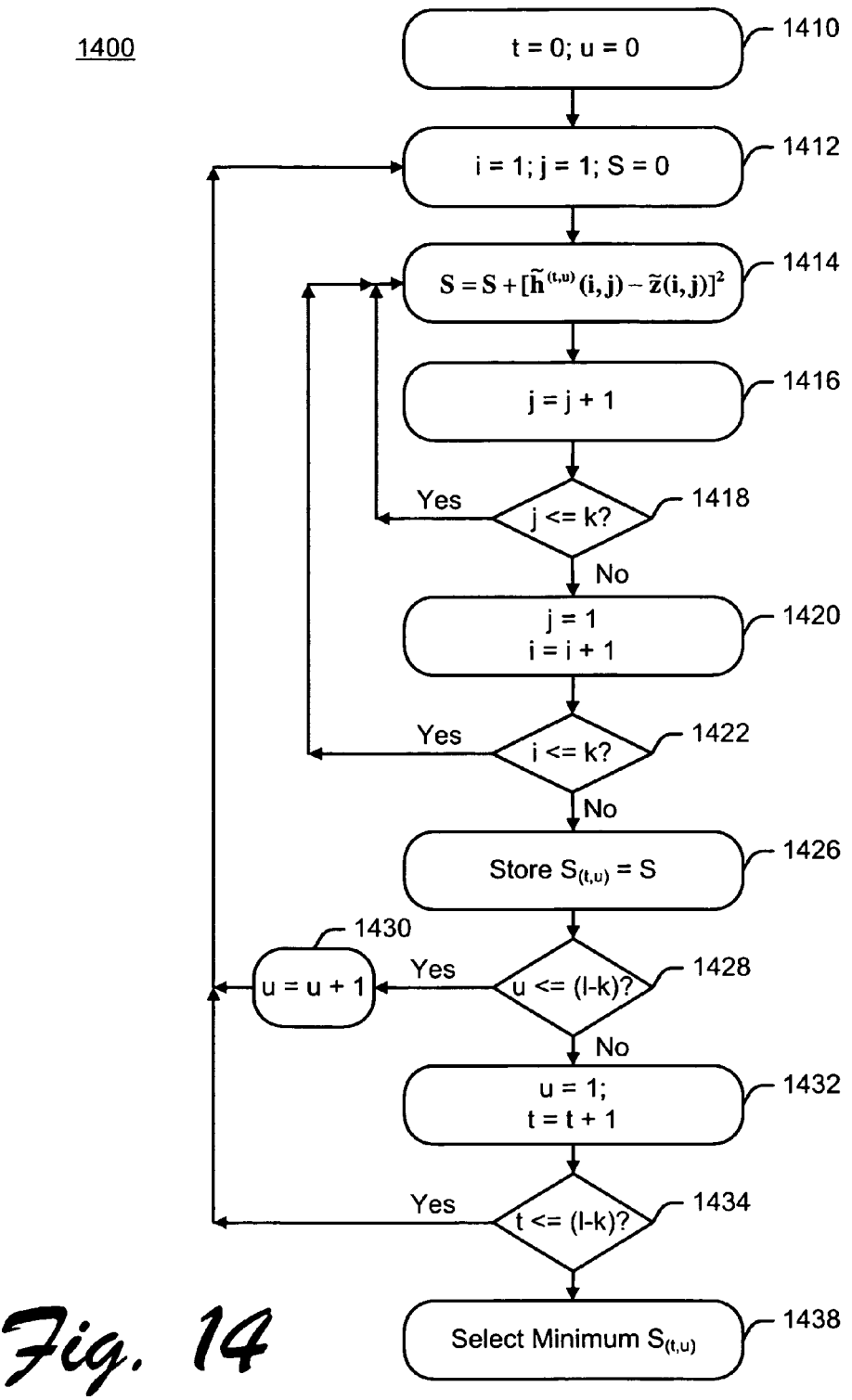
FIG. 14 is a flowchart illustrating fourth exemplary operations for correlating a first image and a second image.

FIG. 14 is a flowchart illustrating exemplary operations 1400 for implementing the oracle method in the $\tilde{h}$, $\tilde{z}$ domain. At operation 1410 the counters t and u are initialized to zero and at operation 1412 the counters i and j are initialized to one, and S is initialized to zero. At operation 1414 S is updated to:

$$S = S + [\tilde{h}^{(t,u)}(i,j) - \tilde{z}(i,j)]^2 \quad \text{Equation (9)}$$

At operation 1416 j is incremented and at operation 1418 it is determined whether j is less than or equal to k, and if so then control passes back to operation 1414, and S is updated with the incremented value of j. The loop comprising operations 1414 through 1418 is repeated until, at operation 1418, j is greater than k, whereupon control passes to operation 1420, where j is reset to 1 and i is incremented.

At operation 1422 it is determined whether i is less than or equal to k, and if so then control passes back to operation 1414, where S is updated. By contrast, if at operation 1422 i is greater than k then control passes to operation 1426 and the value of S is stored in a suitable memory location as $S_{(t,u)}$. At operation 1428, it is determined whether u is less than the value of (l−k), and if so then control passes to 1430, where u is incremented. Control then passes back to operation 1412, where i, j, and S are reset. The loop comprising operations 1412 through 1428 is repeated until u is greater than the value of (l−k), at which point control passes to operation 1432, where u is reset to 1 and t is incremented.

At operation 1434 it is determined whether t is less than the value of (l−k), and if so then control passes back to operation 1412. The loop comprising operations 1412 through 1434 is repeated until t is greater than the value of (l−k), whereupon control passes to operation 1438, and the minimum value of $S_{(t,u)}$ is selected.

In an exemplary embodiment, the values of $S_{(t,u)}$ stored in memory in operation 1426 may be stored in an array. Thus, the operation of selecting the minimum value of $S_{(t,u)}$ stored in memory may be implemented by scanning the array for the minimum value of $S_{(t,u)}$. In an alternate embodiment, a single memory location may be used and operation 1426 compares each S to the stored value of $S_{(t,u)}$ and saves the value of S in memory only if the value of S is less than the value of $S_{(t,u)}$.

The second step may be expressed as finding the coordinates $(\hat{x}_{20}, \hat{y}_{20})$ that solve the following equation:

$$(\hat{x}_{20}, \hat{y}_{20}) = \mathrm{argmin}_{(t,u) \in S^2} \sum_{i=1}^{n} \sum_{j=1}^{n} \left[ \tilde{h}^{(\tilde{x}10 \cdot p + t, \tilde{y}10 \cdot p + u)}(i,j) - \tilde{z}(i,j) \right]^2 \quad \text{Equation (10)}$$

In Equation (10), $S^2 = \{-p, -p+1, \ldots, p-1, p\}$. Accordingly, the estimate of $\hat{x}_0 = \hat{x}_{10} + \hat{x}_{20}$ and the estimate of $\hat{y}_0 = \hat{y}_{10} + \hat{y}_{20}$.

Figure 15:
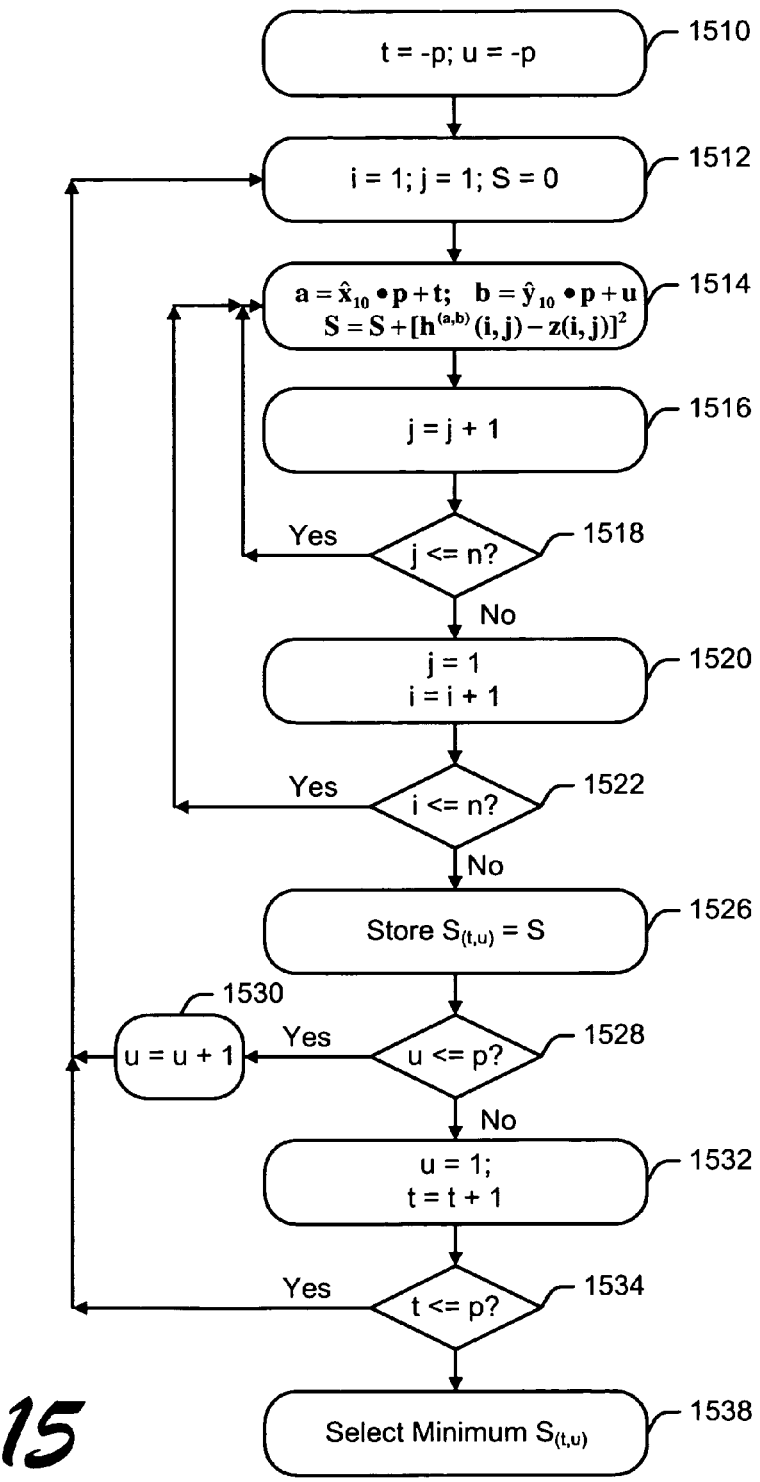
FIG. 15 is a flowchart illustrating fifth exemplary operations for correlating a first image and a second image.

FIG. 15 is a flowchart illustrating exemplary operations 1500 for implementing the oracle method in the $\tilde{h}$, $\tilde{z}$ domain. At operation 1510 the counters t and u are initialized to zero and at operation 1512 the counters i and j are initialized to one, and S is initialized to zero. At operation 1514 the values of a, b, and S are updated as follows:

$$S = S + [h^{(a,b)}(i,j) - z(i,j)]^2 \quad \text{Equation (11)}$$

At operation 1516 j is incremented and at operation 1518 it is determined whether j is less than or equal to n, and if so then control passes back to operation 1514, where the values of a, b, and S are updated with the incremented value of j. The loop comprising operations 1514 through 1518 is repeated until, at operation 1518, j is greater than n, whereupon control passes to operation 1520, where j is reset to 1 and i is incremented.

At operation 1522, it is determined whether i is less than or equal to n, and if so then control passes back to operation 1514, where the values of a, b, and S are updated. By contrast, if at operation 1522 i is greater than n, then control passes to operation 1526 and the value of S is stored in a suitable memory location as $S_{(t,u)}$. At operation 1528 it is determined whether u is less than the value of p, and if so then control passes to 1530, where u is incremented. Control then passes back to operation 1512, where i, j, and S are reset. The loop comprising operations 1512 through 1528 is repeated until u is greater than the value of p, at which point control passes to operation 1532, where u is reset to 1 and t is incremented.

At operation 1534 it is determined whether t is less than the value of p, and if so then control passes back to operation 1512. The loop comprising operations 1512 through 1534 is repeated until t is greater than the value of p, whereupon control passes to operation 1538, and the minimum value of $S_{(t,u)}$ is selected.

In an exemplary embodiment, the values of $S_{(t,u)}$ stored in memory in operation 1526 may be stored in an array. Thus, the operation of selecting the minimum value of $S_{(t,u)}$ stored in memory may be implemented by scanning the array for the minimum value of $S_{(t,u)}$. In an alternate embodiment, a single memory location may be used and operation 1526 compares each S to the stored value of $S_{(t,u)}$ and saves the value of S in memory only if the value of S is less than the value of $S_{(t,u)}$.

The idea behind the two-step process is generally applicable to a multi-step (e.g., q-step) process. In a multi-step process, subsampled versions of the original images (resized versions) are computed for each of these steps (i.e., a total of q of them), such that the images for the last step are exactly equal to the original images and the sizes of these resized images are in increasing order for each step. Then, the oracle solution may be computed for the first step (i.e., using the smallest size images) and the solution may be refined at each next step using the resized versions of the original images for the corresponding step. The refinement may concentrate on a specific area that is suggested by the refined solution from the previous step. Furthermore, different kinds of resizing procedures may be used in order to produce these different resized images. By way of example, averaging techniques discussed in the previous steps may be used, but there are other kinds of resizing methods that are well-known in the literature (i.e., different decimation and interpolation methods well-known in the signal processing literature).

Joint Estimation of Rotation and Translation

In another implementation the rotation and translation amount are estimated jointly. In an exemplary implementation, a digital image of known dimensions is surrounded by a border also of known dimensions. The border may be substantially entirely white or substantially entirely dark. A scanned version of a printed copy of the digital image and logo is resized to fit the digital image. The resized image is then rotated through a series of angles, $\theta_i$, where $\theta_{min} \leq \theta_i \leq \theta_{max}$. At each angle $\theta_i$, candidate values for the displacement coordinates $(x_0, y_0)$ are determined, a correlation function is computed between the scanned image and the digital image at each candidate value, and the displacement coordinates $(x_0, y_0)$ that yield the maximum correlation are stored in a suitable memory location. The candidate angle $\theta_i$ and the displacement coordinates $(x_0, y_0)$ that yield the maximum correlation are selected as the rotation angle and translation parameters.

Figure 16A:
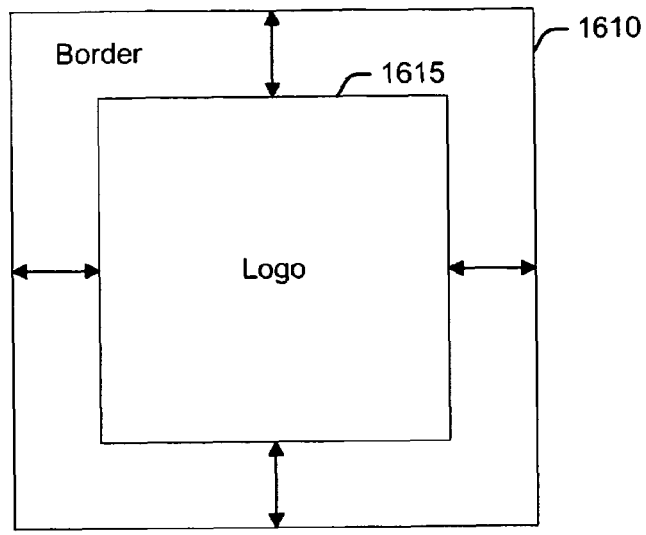
FIGS. 16a-16b are schematic illustrations of an exemplary image and corresponding scanned image of a printed copy of the exemplary image.
Figure 16B:
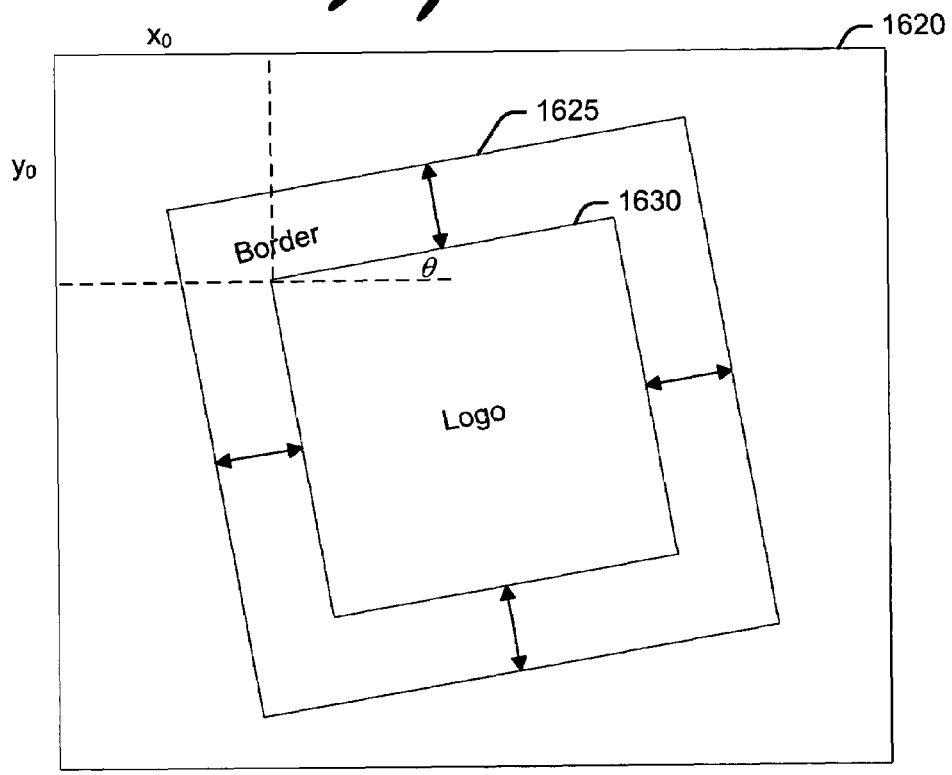

FIGS. 16a and 16b are schematic illustrations of an exemplary digital image and corresponding scanned image of a printed copy of the digital image. Referring to FIG. 16a, a digital image such as a logo 1615 includes is surrounded by a border 1610. The logo 1615 and border 1610 are of known dimensions. In an exemplary implementation the logo measures (40×40) pixels, and the border measures 3 pixels, so the entire image measures (46×46) pixels. The particular measurements of the logo and the border are not critical.

FIG. 16b is a schematic depiction of a scanned image 1620 of a printed copy of the logo 1615 and border 1610 depicted in FIG. 16a. Typically, the scanned image is an upsampled and halftoned version of the original digital image, together with background data. In the illustrated example, the scanned image 1620 includes an image of the logo 1630 and an image of the border 1625. The images of the logo 1630 and border are displaced from the upper left corner of the scanned image 1620 by displacement coordinates $(x_0, y_0)$ and may be rotated by an angle $\theta$.

Figure 17:
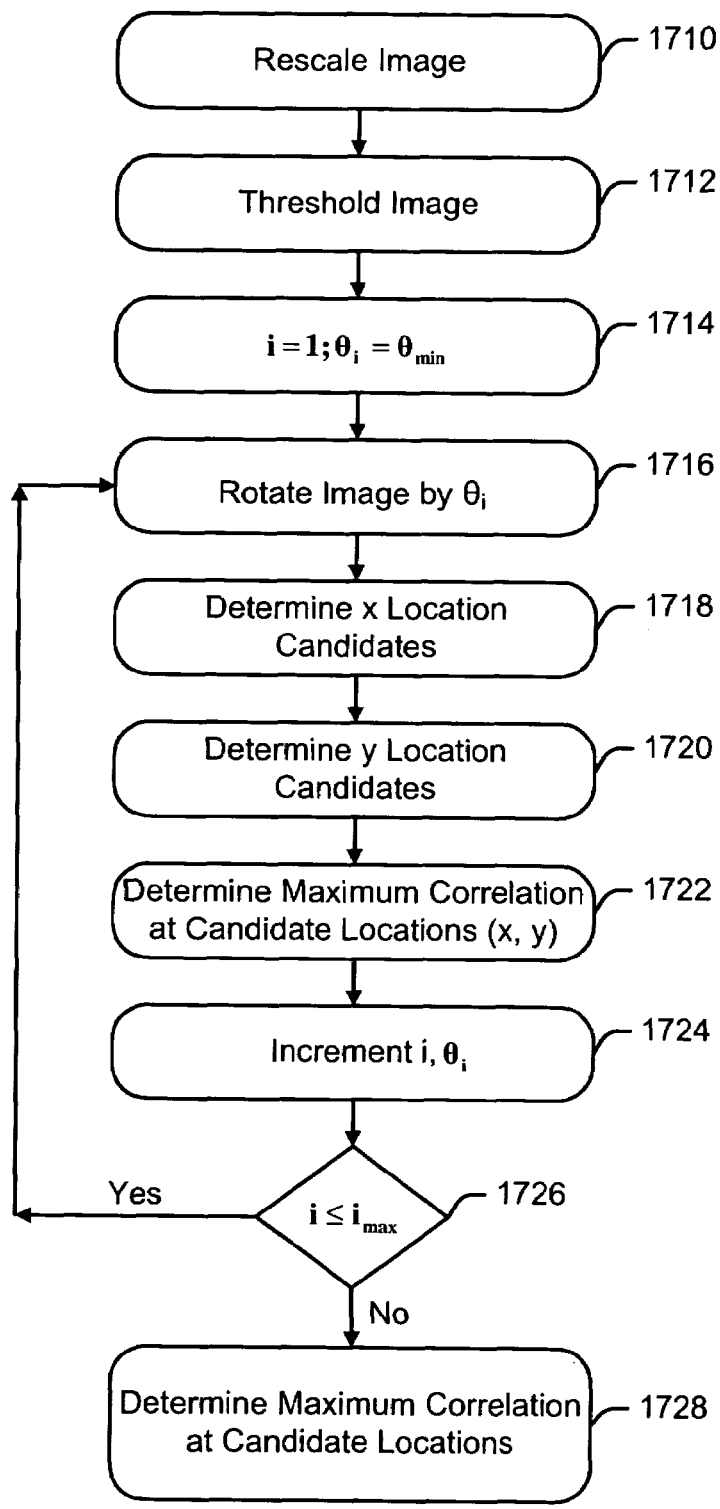
FIG. 17 is a flowchart illustrating exemplary operations for estimating a rotation angle and displacement coordinates of a scanned image.

FIG. 17 is a flowchart illustrating exemplary operations 1700 for estimating the rotation angle $\theta$ and the displacement coordinates $(x_0, y_0)$. At operation 1710 the scanned image is scaled by a factor sufficient to adjust the dimensions of the scanned image to match the dimensions of the original digital image. By way of example, the scanned image of FIG. 16b would be scaled to (46×46) pixels to match the size of the original digital image of FIG. 16a. Typically, the size of a digital image is increased during the printing process, so operation 1710 will typically involve reducing the size of the scaled image.

At operation 1712 a threshold function is applied to the scanned image when it is rescaled. The threshold function assigns a binary zero or a binary one to each pixel of the resized image. In an exemplary implementation, the numeric values of the pixels in the scanned image are added and averaged over a section of the image corresponding to a single pixel in the rescaled image, and if the average exceeds a threshold, then the pixel in the rescaled image is assigned a binary one. By contrast, if the average is less than the threshold, then the pixel is assigned a binary zero. The threshold value is typically a function of the digital encoding of the scanning process. For example, if each pixel of the scanned image is recorded in a grayscale value that ranges from 0 to 255, then a threshold value of 127 may be applied. Alternatively, the threshold value may be determined as a function of the grayscale values in the section of the image corresponding to a single pixel in the rescaled image. For example, the average value of the pixels in a section of the image may be used as a threshold. The threshold value may change as a function of the scaling operation and as a function of the encoding scheme used in the scanning process.

At operation 1714 a counter i is set to 1 and the value of $\theta_i$ is set to $\theta_{min}$. In an exemplary implementation the scanned image is rotated through a range of angles between $-90°$ and $90°$, such that value of $\theta_{min}$ is $-90°$. In an alternate implementation the scanned image is rotated through a range of angles between $-45°$ and $45°$, such that value of $\theta_{min}$ is $-45°$. At operation 1716 the scanned image 1620 is rotated by an angle $\theta_i$.

At operation 1718 candidates for the displacement coordinate $x_0$ are determined. In an exemplary implementation determining candidates for the displacement coordinate $x_0$ involves several operations. The sum of pixel values across rows are computed, e.g., by summing the rows of the matrix to get the resulting vector, referred to as the rowsum vector. In an exemplary implementation, the border region 1625 is substantially entirely white, while the logo is not. Therefore, the rowsum vector will have abrupt changes in value at the interface between the border 1625 and the logo 1630.

A difference vector is calculated by subtracting from the $i^{th}$ element of the rowsum vector the $(i+borderwidth)^{th}$ element of the rowsum vector. For example, if the width of the border is three pixels, then the difference vector is calculated by subtracting the from the $i^{th}$ element of the rowsum vector the $(i+3)^{th}$ element of the rowsum vector. The elements of the difference vector for which the absolute value is larger than a threshold value are stored as potential candidates for a displacement parameter y. This threshold value is a user-determined parameter.

The analogous procedure is repeated for the column sums, and the resulting elements of the difference vector for which the absolute value is larger than a threshold are stored as potential candidates for a displacement parameter x (operation 1720). The thresholds for the row sums and the column sums may potentially be different.

For each of the candidate displace parameter pairs $(x_i, y_i)$ a correlation value is computed between the original digital image and the section of the rotated, scaled image positioned at each location within a confidence region surrounding $(x_i, y_i)$ (operation 1722). In an exemplary implementation, the correlation function may comprise an element-by-element multiplication of the original digital image and the selected section of the rotated, scaled image. Alternatively, the correlation value may be computed as the negative of a norm of the difference between the original digital image and the selected section of the rotated, scaled image; in that case typically $L^2$ norm is used, although other norms may also be used. The location that results in the highest correlation is selected as the candidate displacement coordinate set $(x_i, y_i)$ at the orientation angle $\theta_i$. The candidate displacement coordinate set may be stored in a suitable memory location, e.g., an array, and associated with the orientation angle $\theta_i$ and the correlation value.

In an exemplary implementation operations 1716 through 1724 are repeated for each angle $\theta_i$ through which the scanned image is rotated, resulting in an array of correlation values associated with associated with an orientation angle $\theta_i$ and a displacement coordinate set $(x_i, y_i)$. At operation 1728, the array is searched for the maximum correlation value, and the corresponding orientation angle $\theta_i$ and a displacement coordinate set $(x_i, y_i)$ are selected to represent the orientation angle $\theta$ and the displacement coordinate set $(x_0, y_0)$. In an alternate implementation, only the maximum correlation value may be retained, rather than storing an array of correlation values. For example, the first correlation value associated with $\theta_1$ and $(x_1, y_1)$ may be stored in a memory location. Then, the correlation value associated with $\theta_2$ and $(x_2, Y_2)$ may be compared to the correlation value associated with $\theta_1$ and $(x_1, y_1)$, and the information associated with the larger of the correlation values stored in memory. This process may be repeated such that, at the end of the process, the largest correlation value and the associated orientation angle $\theta$ and displacement coordinate set $(x, y)$ are stored in memory.

In an exemplary implementation additional processing optionally may be performed to refine the search around the selected values the orientation angle $\theta$ and displacement coordinate set $(x_0, y_0)$. In particular, a confidence region may be defined around each of the orientation angle $\theta$ and the displacement coordinates $x_0$ and $y_0$, and a correlation value is computed between the original digital image and the section of the rotated, scaled image oriented at angles within the confidence region surrounding the orientation angle $\theta$ and positioned at each location within a confidence region surrounding $(x_0, y_0)$. In an exemplary implementation, the correlation function may comprise and element-by-element multiplication of the original digital image and the selected section of the rotated, scaled image. Alternatively, the correlation value may be computed as the negative of a norm of the difference between the original digital image and the selected section of the rotated, scaled image; in that case typically $L^2$ norm is used, although other norms may also be used. The orientation and location that results in the highest correlation are selected as orientation angle $\theta$ and the displacement coordinate set $(x_0, y_0)$.

In an exemplary implementation additional processing optionally may be performed to convert the values of the displacement coordinate set $(x_0, y_0)$ determined using the resized image to a displacement coordinate set $(x_0, y_0)$ for the dimensions of the original scanned image prior to resizing.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

The methods that are explained here are used for matching an original image to a translated and rotated version of it. These techniques may be useful in several different applications, including motion compensation in digital video compression. In case of digital video, these techniques may be used to match blocks and the translation and rotation parameters found determine the motion vector that correspond to that block.

What is claimed is:

1. A method, comprising:
    filtering a scanned image to obtain a transformed image, wherein the transformed image comprises a series of substantially parallel lines of alternating binary pixel values; and
    determining an orientation angle of the scanned image using properties of the transformed image, wherein determining an orientation angle of the scanned image using properties of the transformed image comprises determining an orientation angle using the arctangent of an estimated number of changes in binary pixel values along one or more columns of the transformed image divided by an estimated number of changes in binary pixel values along one or more rows of the transformed image.

2. The method of claim 1, wherein filtering a scanned image to obtain a transformed image comprises applying a linear shift invariant filter to the scanned image to remove meaningful picture information from the scanned image.

3. The method of claim 1, wherein determining an orientation angle of the scanned image using properties of the transformed image comprises:
   estimating the number of changes in binary pixel values along the one or more rows of the transformed image;
   estimating the number of changes in binary pixel values along the one or more columns of the transformed image.

4. The method of claim 1, further comprising subtracting a printing angle from the orientation angle to estimate a rotation angle.

5. The method of claim 1, wherein determining an orientation angle of the scanned image using properties of the transformed image comprises:
   generating a matrix, z, wherein z comprises rows of uniform binary values, and wherein the binary values of one row differ from the binary values of the remaining rows;
   for a series of angles $\theta_i$, wherein $\theta_{min} \leq \theta_i \leq \theta_{max}$, repeating the operations:
      generating a transformed matrix $z\theta$ by rotating the matrix z through $\theta_i$ degrees;
      generating at least one set of coordinates $(x\theta, y\theta)$;
      computing a correlation function between the binary values of the transformed image and the image $z\theta$ positioned at $(x\theta, y\theta)$ of the transformed image; and
   selecting the angle $\theta_i$ that maximizes the correlation function.

6. The method of claim 1, further comprising estimating a translation amount of the scanned image, wherein estimating a translation amount comprises:
   subtracting a printing angle from the orientation angle to estimate a rotation angle;
   rotating the scanned image through the rotation angle; and
   determining an (x, y) coordinate set that maximizes a correlation between a portion of the scanned image and an original digital image.

7. A computer-readable medium comprising computer-executable instructions that, when executed, direct a computer to:
   remove meaningful image information from a scanned image to generate a transformed image;
   determine an orientation angle of the scanned image using the transformed image;
   subtract a printing angle from the orientation angle to estimate a rotation angle; and
   rotate the scanned image through the rotation angle.

8. The computer readable medium of claim 7, further comprising computer-executable instructions that, when executed, direct a computer to apply a linear shift invariant filter to the scanned image to remove meaning image information from the scanned image.

9. The computer readable medium of claim 7, wherein the instructions for determining an orientation angle of the scanned image using properties of the transformed image comprise computer-executable instructions that, when executed, direct a computer to determine an orientation angle using the estimated periodicity of changes in binary pixel values along one or more rows of the transformed image and the estimated periodicity of changes in binary pixel values along one or more columns of the transformed image.

10. The computer readable medium of claim 7, wherein instructions for determining an orientation angle of the scanned image using the transformed image comprise computer-executable instructions that, when executed, direct a computer to determine an angle that maximizes a correlation function between the intersection of the transformed image and a matrix of binary values comprising at least one array of uniform binary values.

11. The computer readable medium of claim 7, wherein instructions for determining an orientation angle of the scanned image using properties of the transformed image comprise computer-executable instructions that, when executed, direct a computer to:
   generate a binary matrix, z, wherein z comprises rows of uniform binary values, and wherein the binary values of one row differ from the binary values of the remaining rows;
   for a series of angles $\theta_i$, wherein $\theta_{min} \leq \theta_i \leq \theta_{max}$:
      generate an image $z\theta\theta$ by rotating z through $\theta_i$ degrees;
      generate at least one set of coordinates $(x\theta, y\theta)$;
      compute a correlation function between the binary values of the transformed image and the image $z\theta$ positioned at $(x\theta, y\theta)$ of the transformed image; and
   select the angle $\theta_i$ that maximizes the correlation function.

12. The computer readable medium of claim 7, further comprising instructions for estimating a translation amount of the scanned image that, when executed, direct a computer to:
   determine an (x, y) coordinate set that maximizes a correlation between a portion of the scanned image and an original digital image.

13. A method, comprising:
   filtering a scanned image to obtain a transformed image, wherein the transformed image comprises a series of substantially parallel lines of alternating binary pixel values;
   determining an orientation angle of the scanned image using properties of the transformed image;
   subtracting a printing angle from the orientation angle to estimate a rotation angle; and
   rotating the scanned image through the rotation angle.

14. The method of claim 13, wherein filtering a scanned image to obtain a transformed image comprises applying a linear shift invariant filter to the scanned image to remove meaningful picture information from the scanned image.

15. The method of claim 13, wherein determining an orientation angle of the scanned image using properties of the transformed image comprises:
   estimating a number of changes in binary pixel values along one or more rows of the transformed image;
   estimating a number of changes in binary pixel values along one or more columns of the transformed image; and
   determining an orientation angle using the arctangent of the number of changes in binary values along one or more columns divided by the number of changes in binary values along one or more rows.

16. The method of claim 13, wherein determining an orientation angle of the scanned image using properties of the transformed image comprises:

generating a matrix, z, wherein z comprises rows of uniform binary values, and wherein the binary values of one row differ from the binary values of the remaining rows;

for a series of angles $\theta i$, wherein $\theta min \leq \theta i \leq \theta max$, repeating the operations:
- generating a transformed matrix $z\theta$ by rotating the matrix z through $\theta i$ degrees;
- generating at least one set of coordinates $(x\theta, y\theta)$;
- computing a correlation function between the binary values of the transformed image and the image $z\theta$ positioned at $(x\theta, y\theta)$ of the transformed image; and
- selecting the angle $\theta i$ that maximizes the correlation function.

17. The method of claim 13, further comprising estimating a translation amount of the scanned image, wherein estimating a translation amount comprises:
- determining an (x, y) coordinate set that maximizes a correlation between a portion of the scanned image and an original digital image.

* * * * *